(12) United States Patent
Yu et al.

(10) Patent No.: US 8,237,827 B2
(45) Date of Patent: Aug. 7, 2012

(54) DIGITAL PHOTOGRAPHING APPARATUS FOR CORRECTING SMEAR TAKING INTO CONSIDERATION ACQUIRED LOCATION RELATIONSHIP

(75) Inventors: Hyun-sik Yu, Suwon-si (KR); Byeong-chan Park, Suwon-si (KR); Sang-ryoon Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 12/713,376

(22) Filed: Feb. 26, 2010

(65) Prior Publication Data

US 2010/0220225 A1    Sep. 2, 2010

(30) Foreign Application Priority Data

Feb. 27, 2009    (KR) .................. 10-2009-0017136

(51) Int. Cl.
*H04N 9/64* (2006.01)
*H04N 5/228* (2006.01)

(52) U.S. Cl. .................... 348/248; 348/208.6
(58) Field of Classification Search .............. 348/208.1, 348/208.6, 222.1, 248, 241
See application file for complete search history.

(56) References Cited

U.S. PATENT DOCUMENTS

| 5,798,786 A * | 8/1998 | Lareau et al. ............. 348/144 |
| 7,701,494 B2 * | 4/2010 | Shibasaki .................. 348/241 |
| 8,040,407 B2 * | 10/2011 | Hirai ........................ 348/248 |
| 2006/0274173 A1 * | 12/2006 | Yoshida et al. ............ 348/294 |
| 2007/0153103 A1 * | 7/2007 | Shibasaki ................. 348/241 |
| 2009/0147108 A1 * | 6/2009 | Okura et al. ............... 348/249 |
| 2010/0245621 A1 * | 9/2010 | Hirai ....................... 348/229.1 |

* cited by examiner

*Primary Examiner* — Nicholas Giles
(74) *Attorney, Agent, or Firm* — Drinker Biddle & Reath LLP

(57) ABSTRACT

Provided are a digital photographing apparatus, and associated method and recording medium with method instructions, by which smear generation during moving picture photographing or moving picture display is effectively reduced. The digital photographing apparatus includes an imaging device having an effective area that generates first image data from incident light and an optical black area that is disposed outside the effective area and extends horizontally; a first smear correction unit that corrects the first image data generated by the effective area by using smear data generated by the optical black area, thereby acquiring second image data corresponding to a second frame image comprising less smear than a first frame image corresponding to the first image data; a unit corrects the second image data thereby acquiring third image data.

20 Claims, 14 Drawing Sheets

DIGITAL PHOTOGRAPHING APPARATUS FOR CORRECTING SMEAR TAKING INTO CONSIDERATION ACQUIRED LOCATION RELATIONSHIP

CROSS-REFERENCE TO RELATED PATENT APPLICATION

This application claims the benefit of Korean Patent Application No. 10-2009-0017136, filed on Feb. 27, 2009, in the Korean Intellectual Property Office, the disclosure of which is incorporated herein in its entirety by reference.

BACKGROUND

The present invention relates to a digital photographing apparatus, a method of controlling the same, and a recording medium storing a program to implement the method, and more particularly, to a digital photographing apparatus capable of effectively reducing generation of smears during moving image capturing or moving image display, a method of controlling the digital photographing apparatus, and a recording medium storing a program to implement the method.

Generally, a digital photographing apparatus acquires data from light incident upon an imaging device and stores the data into a storage medium or displays the data as an image on a display unit. In particular, recent digital photographing apparatuses may display live view images, which may be called real-time moving images, on a display unit, or may capture moving images and store the moving images into a storage medium or display the moving images on the display unit. For convenience, "capturing moving images" is herein defined to include the meaning of "displaying live view images on a display unit".

FIG. 1 is a pictorial diagram schematically illustrating generation of a smear during display of a moving image on a display unit of a conventional digital photographing apparatus. Referring to FIG. 1, when the conventional digital photographing apparatus displays a currently or previously captured moving image on the display unit, a strip that may be due to a smear is generated vertically if a highly luminous subject, such as the sun or a window on a building reflecting sunlight, is included among photographed subjects. To address this problem, a method in which an imaging device includes an optical black area has been proposed.

FIGS. 2 and 3 are pictorial diagrams schematically illustrating an image device. The imaging device has an effective area EA and an optical black area OBA. The optical black area OBA and the effective area EA have the same light-receiving element. However, light is incident upon the effective area EA, whereas light is not incident upon the optical black area OBA. If a highly luminous subject is photographed during moving picture photographing, relatively excessive amounts of charges are generated by a light receiving element in a portion EAS where light generated from the highly luminous subject is incident, the portion EAS being a part of the effective area EA. These excessive amounts of charges are transmitted via a vertically extended transfer path and reach a corresponding portion OBAS of the optical black area OBA. Therefore, charges are detected in the corresponding portion OBAS of the optical black area OBA. Data originating from the amount of charges detected by the corresponding portion OBAS is referred to as smear data. Thus, data corresponding to a case where smear is not generated or is reduced may be acquired by subtracting smear data, which is detected in the corresponding portion OBAS of the optical black area OBA, from data produced by the light receiving element in the portion EAS of the effective area EA, upon which the light generated from the highly luminous subject is incident.

When a moving image is captured, a user may perform a photographic operation by using a fixed digital photographing apparatus or while moving the digital photographing apparatus horizontally. However, the conventional digital photographing apparatus fails to effectively prevent smears from being generated when the conventional digital photographing apparatus moves horizontally. In other words, if a user moves a digital photographing apparatus to the right while photographing a highly luminous subject, the portion EAS of the effective area EA, upon which the light generated from the highly luminous subject is incident, moves to the left, but the corresponding portion OBAS of the optical black area OBA, from which excessive charges generated before the movement of the digital photographing apparatus are detected, may not move simultaneously when the portion EAS of the effective area EA moves.

As described above, in a conventional digital photographing apparatus, the smear data, which is detected from the corresponding portion OBAS of the optical black area OBA, is subtracted from data produced by the light receiving element in the portion EAS of the effective area EA, upon which the light generated from the highly luminous subject is incident. Thus, the left side of the portion EAS of the effective area EAm is not subjected to smear correction, but the right side of the portion EAS is subjected to smear correction although smear correction should not occur. Consequently, referring to FIG. 4, in a frame image F1 whose smears are miscorrected when moving pictures are displayed on a display unit of a conventional digital photographing apparatus, there exists a smear-uncorrected portion UCA, a smear-corrected portion CA, and a smear-overcorrected portion OCA. Thus, the display unit displays a moving picture image including two strips corresponding to the portion UCA and the portion OCA, respectively.

SUMMARY

The present invention provides a digital photographing apparatus, a method of controlling the same, and a recording medium having recorded thereon a program for executing the method, by which smear generation during moving picture photographing and/or moving picture display is effectively reduced.

According to an aspect of the present invention, there is provided a digital photographing apparatus including an imaging device comprising an effective area that generates first image data from incident light and an optical black area that is disposed outside the effective area and extends horizontally; a first smear correction unit that corrects the first image data generated by the effective area by using smear data generated by the optical black area, and thereby acquires second image data corresponding to a second frame image comprising less smear than a first frame image corresponding to the first image data; a motion vector acquiring unit that acquires a location relationship between a subject within the second frame image and a subject within a previous frame image for the second frame image; a vertical mean acquiring unit that acquires a pixel brightness mean for each column of the second frame image and a pixel brightness mean for each column of the previous frame image; a miscorrected column identifying unit that identifies columns smear-miscorrected by the first smear correction unit from among columns of the second frame image by comparing the pixel brightness mean for each column of the second frame image and the pixel brightness mean for each column of the previous frame image acquired by the vertical mean acquiring unit, that takes into consideration the location relationship acquired by the motion vector acquiring unit; and a second smear correction unit that corrects the second image data by using data corresponding to columns of the previous frame image that corresponds to the smear-miscorrected columns identified by the miscorrected column identifying unit, thereby acquiring third image data.

The digital photographing apparatus may further include a matching unit that matches the subject within the second frame image with the subject within the previous frame image in a horizontal direction by correcting at least one of data about the second image data and data about the previous frame image by using the location relationship acquired by the motion vector acquiring unit.

The miscorrected column identifying unit may identify columns smear-miscorrected by the first smear correction unit from among the columns of the second frame image, based on a difference between the pixel brightness mean for each column of the second frame image and the pixel brightness mean for each column of the previous frame image acquired by the vertical mean acquiring unit, the difference being obtained that takes into consideration the location relationship acquired by the motion vector acquiring unit.

The second smear correction unit may correct the second image data by replacing data corresponding to the smear-miscorrected columns identified by the miscorrected column identifying unit with the data corresponding to the corresponding column of the previous frame image, thereby obtaining the third image data.

According to another aspect of the present invention, there is provided a method of controlling a digital photographing apparatus, the method including: correcting first image data generated from light incident upon an effective area of an imaging device by using smear data generated by an optical black area that is disposed outside the effective area of the imaging device and extends horizontally, thereby obtaining second image data corresponding to a second frame image having reduced smear compared to a first frame image obtained from the first image data; acquiring a location relationship between a subject within the second frame image and a subject within a previous frame image for the second frame image; acquiring a pixel brightness mean for each column of the second frame image; acquiring a pixel brightness mean for each column of the previous frame image; comparing the acquired pixel brightness mean for each column of the second frame image to the acquired pixel brightness mean for each column of the previous frame image taking into consideration the acquired location relationship, thereby identifying smear-miscorrected columns from among the columns of the second frame image; and correcting the second image data by using data corresponding to columns of the previous frame image that corresponds to the identified smear-miscorrected columns, thereby obtaining third image data.

The acquiring of the location relationship may include matching the subject within the second frame image with the subject within the previous frame image in a horizontal direction by correcting at least one from among data about the second image data and data about the previous frame image.

The identifying of the smear-miscorrected columns may include identifying the smear-miscorrected columns from among the columns of the second frame image according to a difference between the pixel brightness mean for each column of the second frame image and the pixel brightness mean for each column of the previous frame image, the difference being obtained that takes into consideration the location relationship.

The acquiring of the third image data may include obtaining the third image data by correcting the second image data by replacing data corresponding to the identified smear-miscorrected columns with the data corresponding to the corresponding columns of the previous frame image.

According to another aspect of the present invention, there is provided a digital photographing apparatus including an imaging device comprising an effective area that generates first image data from incident light and an optical black area that is disposed outside the effective area and extends horizontally; a motion vector acquiring unit that acquires a location relationship between a subject within a first frame image corresponding to first image data generated by the effective area and a subject within a previous frame image for the first frame image; a vertical mean acquiring unit that acquires a pixel brightness mean for each column of the first frame image and a pixel brightness mean for each column of the previous frame image; a compensated brightness mean acquiring unit that acquires a compensated brightness mean by subtracting smear data generated by the optical black area from the pixel brightness mean for each column of the first frame image acquired by the vertical mean acquiring unit; an error data acquiring unit that acquires error data by comparing the compensated brightness mean acquired by the compensated brightness mean acquiring unit with the pixel brightness mean for each column of the previous frame image acquired by the vertical mean acquiring unit that takes into consideration the location relationship acquired by the motion vector acquiring unit; a corrected smear data acquiring unit that acquires corrected smear data by correcting the smear data by using the error data acquired by the error data acquiring unit; and a smear correction unit that corrects the first image data by using the corrected smear data acquired by the corrected smear data acquiring unit, thereby acquiring second image data.

The digital photographing apparatus may further include a matching unit that matches the subject within the first frame image with the subject within the previous frame image in a horizontal direction by correcting at least one from among data about the first image data and data about the previous frame image by using the location relationship acquired by the motion vector acquiring unit.

The error data acquiring unit may acquire the error data by using a difference between the compensated brightness mean acquired by the compensated brightness mean acquiring unit and the pixel brightness mean for each column of the previous frame image acquired by the vertical mean acquiring unit, the difference being obtained that takes into consideration the location relationship acquired by the motion vector acquiring unit.

According to another aspect of the present invention, there is provided a method of controlling a digital photographing apparatus, the method including: acquiring a pixel brightness mean for each column of a first frame image corresponding to first image data generated from light incident upon an effective area of an imaging device; acquiring a compensated brightness mean by subtracting, from the acquired pixel brightness mean for each column of the first frame image, smear data generated by an optical black area of the imaging device that is disposed outside the effective area and extends horizontally; acquiring a location relationship between a subject within the first frame image and the same subject within a previous frame image for the first frame image; acquiring a pixel brightness mean for each column of the previous frame image; acquiring error data by comparing the acquired compensated brightness mean with the pixel brightness means for each column of the previous frame image; acquiring corrected smear data by correcting the smear data by using the error data; and acquiring second image data by correcting the first image data by using the corrected smear data.

The acquiring of the location relationship may include matching the subject within the first frame image with the subject within the previous frame image in a horizontal direction by correcting at least one from among data about the first image data and data about the previous frame image.

The acquiring of the error data may include acquiring the error data according to a difference between the acquired compensated brightness mean and the acquired pixel brightness mean for each column of the previous frame image, the difference being obtained that takes into consideration the acquired location relationship.

According to another aspect of the present invention, there is provided a digital photographing apparatus including an imaging device having an effective area that generates image data from incident light and an optical black area that is disposed outside the effective area and extends horizontally; a first smear correction unit that corrects first image data generated by the effective area by using smear data generated by the optical black area, thereby acquiring second image data corresponding to a second frame image having less smear than a first frame image corresponding to the first image data; a motion vector acquiring unit that acquires a location relationship between a subject within the second frame image and a subject within a previous frame image for the second frame image; a vertical mean acquiring unit that acquires a pixel brightness mean for each column of the second frame image and a pixel brightness mean for each column of the previous frame image; a miscorrected data acquiring unit that acquires miscorrected data about smear-miscorrected columns from among columns of the second frame image and the amounts of the miscorrection, by comparing the pixel brightness mean for each column of the second frame image and the pixel brightness means for each column of the previous frame image acquired by the vertical mean acquiring unit, that takes into consideration the location relationship acquired by the motion vector acquiring unit; a corrected smear data acquiring unit that acquires corrected smear data by correcting the smear data by using the miscorrected data acquired by the miscorrected data acquiring unit; and a second smear correction unit that corrects the first image data by using the corrected smear data acquired by the corrected smear data acquiring unit, thereby acquiring third image data.

The digital photographing apparatus may further include a matching unit that matches the subject within the second frame image with the subject within the previous frame image in a horizontal direction by correcting at least one from among data about the second image data and data about the previous frame image by using the location relationship acquired by the motion vector acquiring unit.

The miscorrected data acquiring unit may acquire miscorrected data about smear-miscorrected columns from among columns of the second frame image and the amounts of the miscorrection, based on a difference between the pixel brightness mean for each column of the second frame image and the pixel brightness mean for each column of the previous frame image acquired by the vertical mean acquiring unit, the difference being obtained that takes into consideration the location relationship acquired by the motion vector acquiring unit.

According to another aspect of the present invention, there is provided a method of controlling a digital photographing apparatus, the method including: correcting first image data generated from light incident upon an effective area of an imaging device by using smear data generated by an optical black area that is disposed outside the effective area of the imaging device and extends horizontally, thereby obtaining second image data corresponding to a second frame image having less smear than a first frame image obtained from the first image data; acquiring a location relationship between a subject within the second frame image and a subject within a previous frame image for the second frame image; acquiring a pixel brightness mean for each column of the second frame image; acquiring a pixel brightness mean for each column of the previous frame image; comparing the acquired pixel brightness mean for each column of the second frame image with the acquired pixel brightness mean for each column of the previous frame image, that takes into consideration the acquired location relationship, thereby acquiring miscorrected data about smear-miscorrected columns from among the columns of the second frame image and about the amounts of miscorrection; acquiring corrected smear data by correcting the smear data by using the miscorrected data; and acquiring third image data by correcting the first image data by using the corrected smear data.

The acquiring of the location relationship may include matching the subject within the second frame image with the subject within the previous frame image in a horizontal direction by correcting at least one from among data about the second image data and data about the previous frame image.

The acquiring of the miscorrected data may include acquiring the miscorrected data about the smear-miscorrected columns from among the columns of the second frame image and about the amounts of miscorrection according to a difference between the pixel brightness mean for each column of the second frame image and the pixel brightness mean for each column of the previous frame image, the difference being obtained that takes into consideration the location relationship.

According to another aspect of the present invention, there is provided a computer program product, comprising a computer usable medium having a computer readable program code embodied therein, said computer readable program code adapted to be executed to implement any one of the above-described methods.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, the present invention will be described in detail by explaining preferred embodiments of the invention with reference to the attached drawings.

Figure 5:
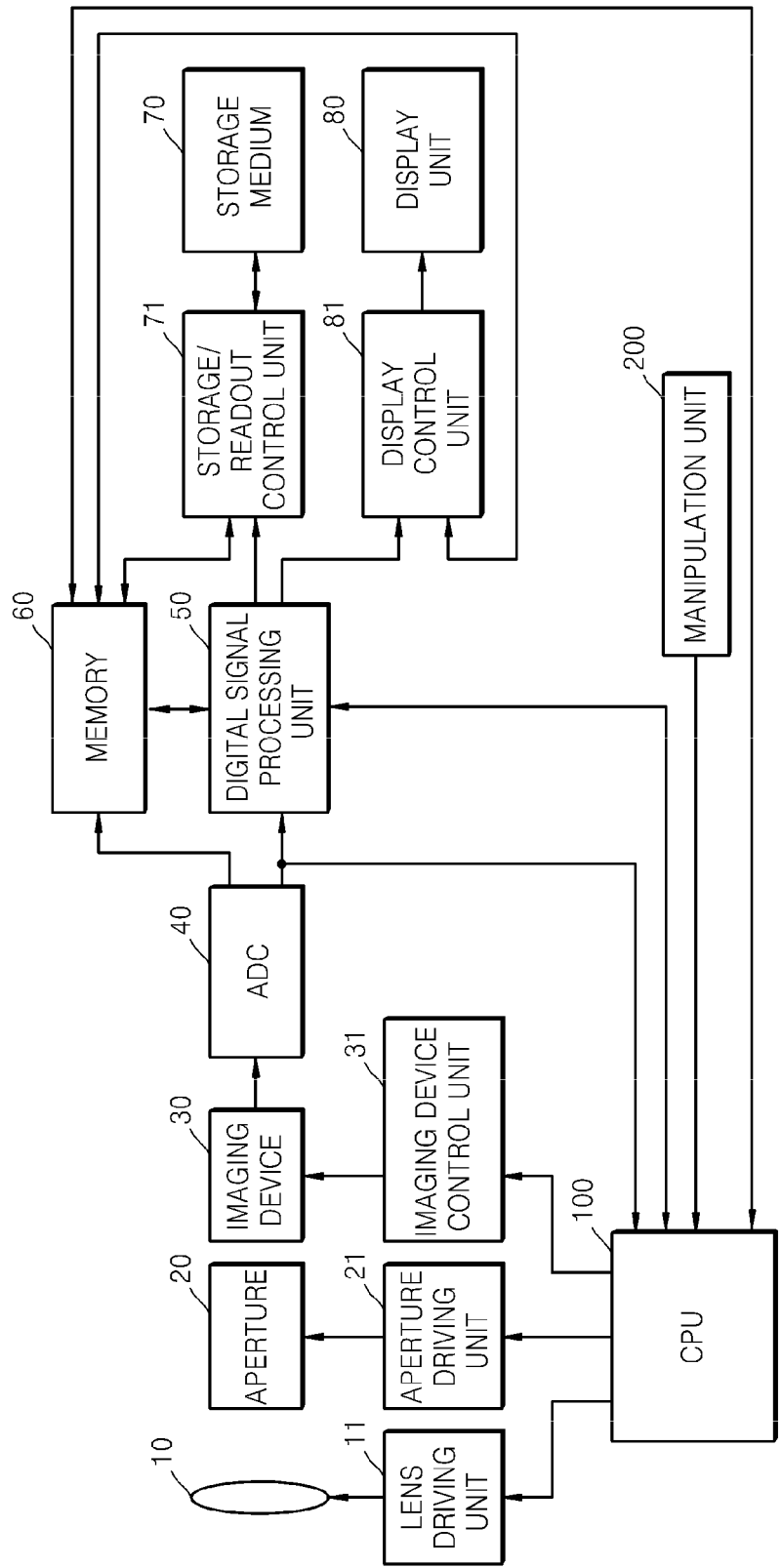
FIG. 5 is a block diagram of a digital photographing apparatus according to an embodiment of the present invention.
Figure 6:
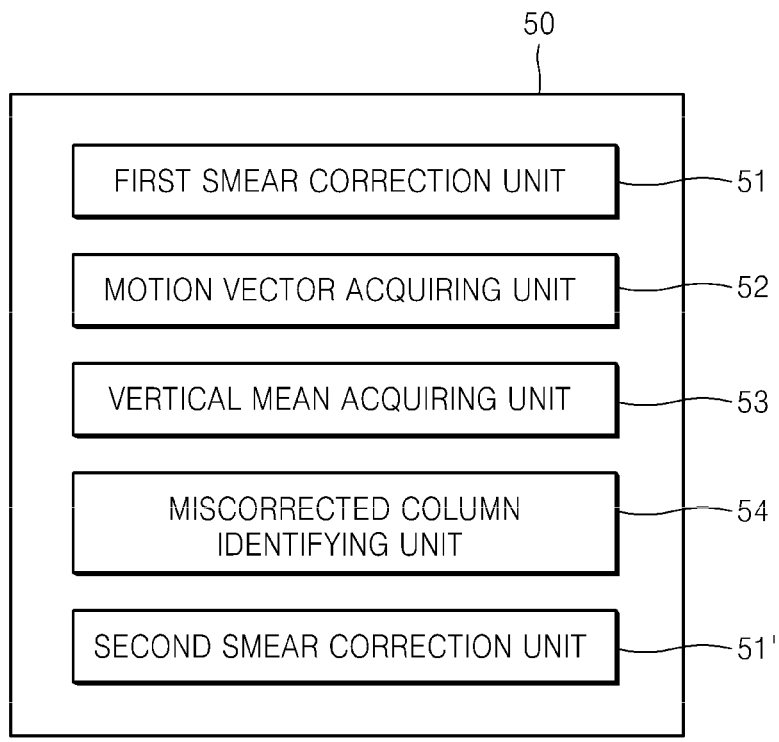
FIG. 6 is a block diagram of a portion of the digital photographing apparatus of FIG. 5, according to an embodiment of the present invention.

FIG. 5 is a block diagram of a digital photographing apparatus according to an embodiment of the present invention. FIG. 6 is a block diagram of a portion of the digital photographing apparatus of FIG. 5.

The entire operation of the digital photographing apparatus may be controlled by a central processing unit (CPU) 100. The digital photographing apparatus includes a manipulation unit 200 including a key and the like, which generates an electrical signal corresponding to a user's manipulation. The electrical signal is transmitted from the manipulation unit 200 to the CPU 100 so that the CPU 100 can control the digital photographing apparatus according to the electrical signal.

In a photographing mode, as the electrical signal corresponding to the user's manipulation is applied to the CPU 100, the CPU 100 examines the electrical signal and controls a lens driving unit 11, an aperture driving unit 21, and an imaging device control unit 31, whereby the position of a lens 10, the degree of opening of an aperture 20, the sensitivity of an imaging device 30, and the like are controlled, respectively. Similar to the imaging device described above with reference to FIG. 2, the imaging device 30 has an effective area EA that generates image data from incident light, and an optical black area OBA that is disposed outside the effective area EA and extends horizontally. In contrast with FIG. 2, the optical black area OBA may be located below the effective area EA. The imaging device 30 generates data from light incident upon the effective area EA. An analog-to-digital converter (ADC) 40 converts analog data output from the imaging device 30 into digital data. The ADC 40 may or may not be installed, according to the characteristics of the imaging device 30.

The data generated from the effective area EA and/or the optical black area OBA of the imaging device 30 may be input to a digital signal processing unit 50 via a memory 60 or may be input to the digital signal processing unit 50 without passing through the memory 60. In some cases, the data may also be input to the CPU 100. The memory 60 may include a ROM, a RAM, or the like. The digital signal processing unit 50 may perform digital signal processing, such as gamma correction or white balance control. As will be described more fully below, the digital signal processing unit 50 includes a first smear correction unit 51, a motion vector acquiring unit 52, a vertical mean acquiring unit 53, a miscorrected column identifying unit 54, and a second smear correction unit 51', and thus effectively reduces generation of smears during moving picture photographing or moving picture display. The first smear correction unit 51, the motion vector acquiring unit 52, the vertical mean acquiring unit 53, the miscorrected column identifying unit 54, and the second smear correction unit 51' may be components separate from the digital signal processing unit 50, that is, may not be included in the digital signal processing unit 50. Alternatively, the first smear correction unit 51, the motion vector acquiring unit 52, the vertical mean acquiring unit 53, the miscorrected column identifying unit 54, and the second smear correction unit 51' may be a part of another component. As such, various changes may be made. In other words, the digital photographing apparatus according to the present embodiment should include the digital signal processing unit 50 including the first smear correction unit 51, the motion vector acquiring unit 52, the vertical mean acquiring unit 53, the miscorrected column identifying unit 54, and the second smear correction unit 51'. Functions of the first smear correction unit 51, the motion vector acquiring unit 52, the vertical mean acquiring unit 53, the miscorrected column identifying unit 54, and the second smear correction unit 51' will be described below.

Data output from the digital signal processing unit 50 may be transmitted to a display control unit 81 via the memory 60 or may be directly transmitted to the display control unit 81. The display control unit 81 controls a display unit 80 to display a moving picture on the display unit 80. The data output from the digital signal processing unit 50 may also be input to a storage/readout control unit 71 via the memory 60 or may be directly transmitted to the storage/readout control unit 71. The storage/readout control unit 71 may store data in a storage medium 70 according to a generated signal corresponding to a user's manipulation or in an automatic manner. Of course, the storage/readout control unit 71 may read out data associated with a moving picture from a moving picture file stored in the storage medium 70 and input the read-out data to the display control unit 81 via the memory 60 or via another path so that the moving picture can be displayed on the display unit 80. The storage medium 70 may be detachable from or may be fixed to the digital photographing apparatus.

The digital photographing apparatus may have a still image photographing function in addition to a moving picture photographing function.

Functions of the first smear correction unit 51, the motion vector acquiring unit 52, the vertical mean acquiring unit 53, the miscorrected column identifying unit 54, and the second smear correction unit 51' will now be described with reference to FIGS. 7 through 12.

Figure 7:
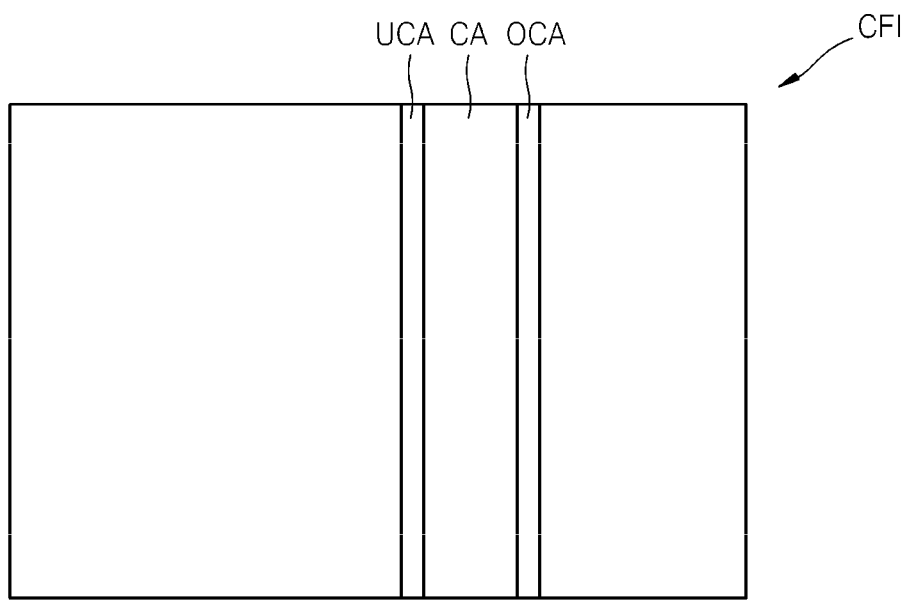
FIG. 7 is a pictorial diagram of a current frame image at an intermediate stage of correction of a smear.

FIG. 7 is a pictorial diagram of a current frame image at an intermediate stage of correction of a smear. As described above, the imaging device 30 has the effective area EA and the optical black area OBA, and thus the data generated from light incident on the effective area EA is referred to as first image data and a frame image from the first image data is referred to as a first frame image. The first smear correction unit 51 corrects the first image data generated by the effective area EA by using smear data generated by the optical black area OBA, thereby acquiring second image data corresponding to a second frame image having less smear than the first frame image from the first image data. Referring to FIG. 7, the current frame image at an intermediate stage of correction of a smear may be a second frame image CFI. When the digital photographing apparatus moves horizontally during moving picture photographing as described above, the second frame image CFI includes a smear-uncorrected portion UCA and a smear-overcorrected portion OCA on left and right sides of a smear-corrected portion CA, respectively, and the smear-uncorrected portion UCA and the smear-overcorrected portion OCA may appear as two strips on the second frame image CFI.

Figure 8:
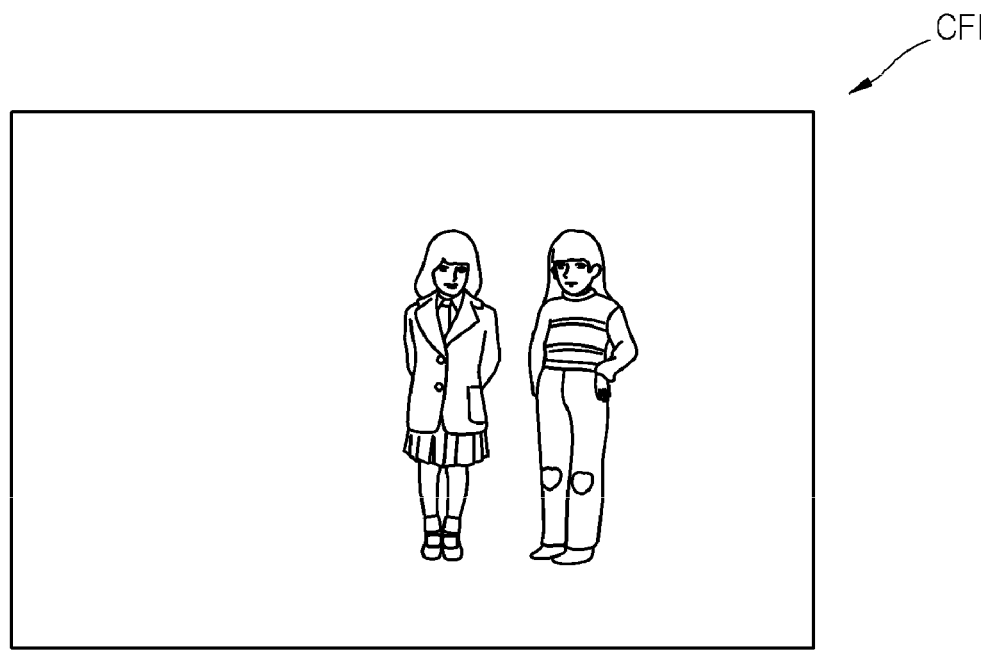
FIG. 8 is a pictorial diagram of a current frame image.
Figure 9:
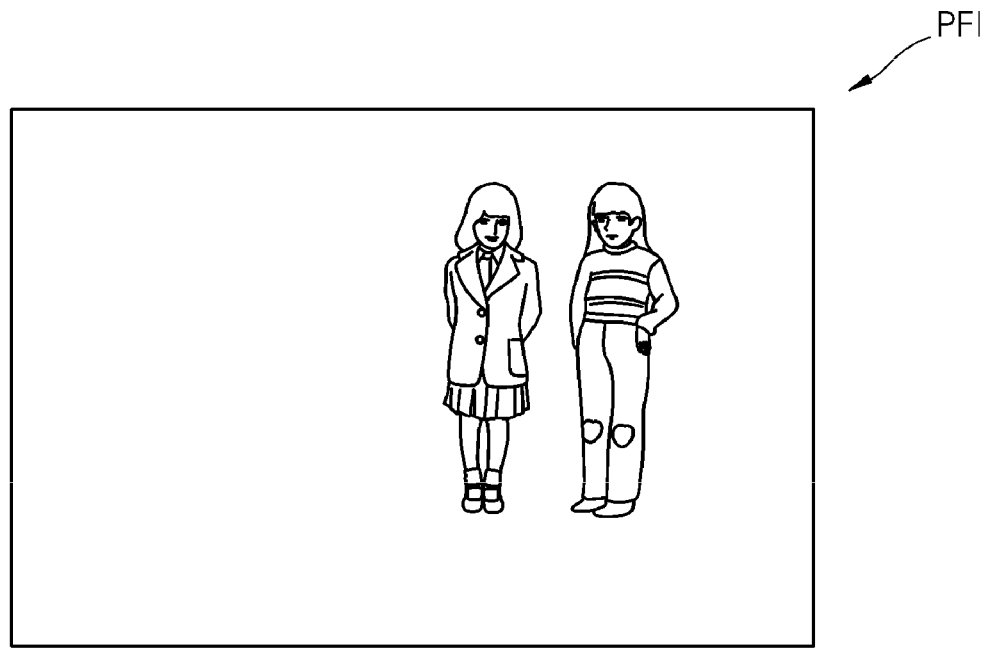
FIG. 9 is a pictorial diagram of a previous frame image.

FIG. 8 is a pictorial diagram of an embodiment of the second frame image CFI, which is a current frame image (smear is omitted for convenience and clarity). FIG. 9 is a pictorial diagram of a previous frame image PFI. Referring to FIGS. 8 and 9, locations of subjects in FIGS. 8 and 9 are different due to the digital photographing apparatus moving to the right during photographing in between FIGS. 8 and 9. The digital photographing apparatus may move not only horizontally but also vertically. Vertical locations of the subjects in FIGS. 8 and 9 are also different.

The motion vector acquiring unit 52 acquires a location relationship between the subject in the second frame image CFI illustrated in FIG. 8 and the subject of the previous frame image PFI illustrated in FIG. 9, which is previous to the second frame image CFI. For example, the motion vector acquiring unit 52 may acquire a direction and distance in which the second frame image CFI of FIG. 8 is to be moved to match the subject in the second frame image CFI illustrated in FIG. 8 with the subject of the previous frame image PFI illustrated in FIG. 9. Since the smear-uncorrected portion UCA and the smear-overcorrected portion OCA appear as vertical strips on the second frame image CFI as illustrated in FIG. 7, the motion vector acquiring unit 52 may acquire a location relationship that considers only horizontal locations but not vertical locations of the subject in the second frame image CFI illustrated in FIG. 8 and the subject of the previous frame image PFI illustrated in FIG. 9.

Figure 10:
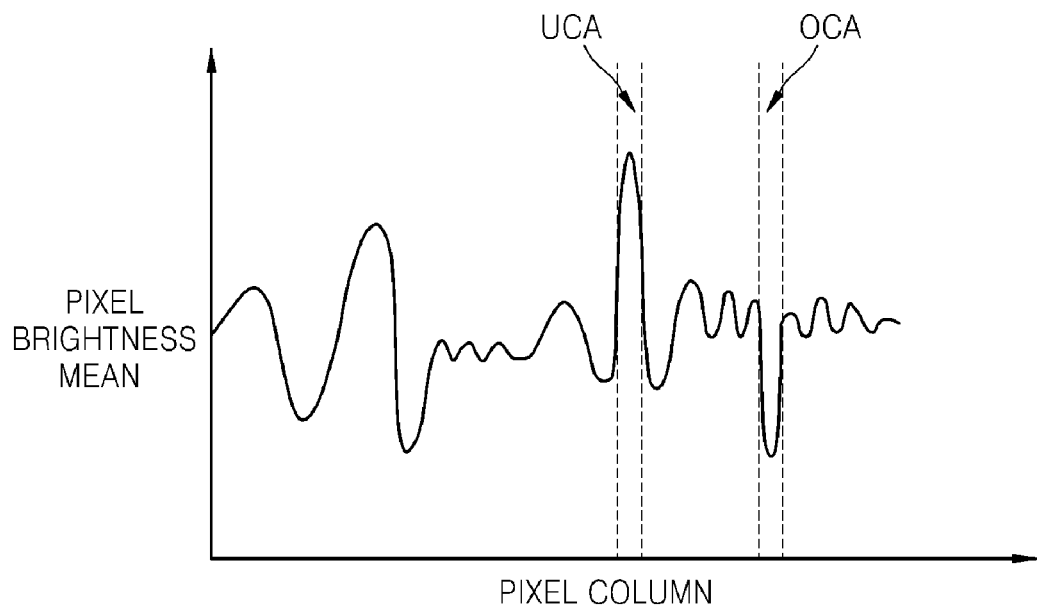
FIG. 10 is a graph schematically plotting a pixel brightness mean for each column in a current frame image in an intermediate stage of smear correction as illustrated in FIG. 7.

The vertical mean acquiring unit 53 acquires a pixel brightness mean for each column in the second frame image CFI illustrated in FIGS. 7 and 8. In other words, if 480 pixels in width and 240 pixels in length are the dimensions of the second frame image CFI, the second frame image CFI may be partitioned into 480 columns, and each of the columns includes 240 pixels. The vertical mean acquiring unit 53 acquires a pixel brightness mean for each column by taking the average of the 240 pixels in a first column, the average of the 240 pixels in a second column, etc. FIG. 10 is a graph schematically plotting a pixel brightness mean for each column in the second frame image CFI, which is a current frame image in an intermediate stage of smear correction as illustrated in FIG. 7. As illustrated in FIG. 10, a pixel brightness mean in the smear-uncorrected portion UCA may be relatively high, and a pixel brightness mean in the smear-overcorrected portion OCA, which should not have been corrected, may be relatively low.

Figure 11:
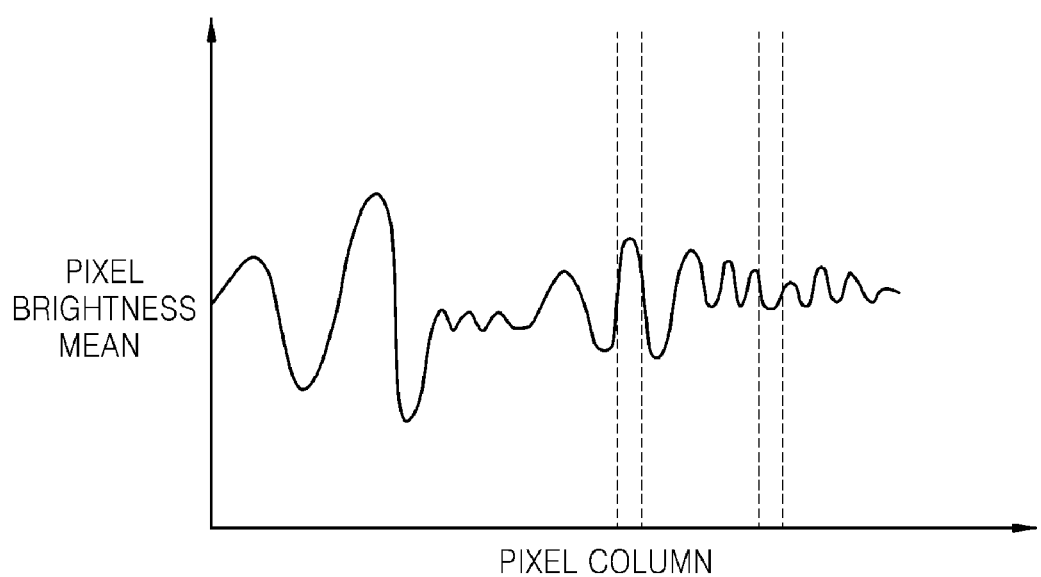
FIG. 11 is a graph schematically plotting a pixel brightness mean for each column in a previous frame image.

The vertical mean acquiring unit 53 acquires not only a pixel brightness mean for each column in the second frame image CFI but also a pixel brightness mean for each column in the previous frame image PFI of FIG. 9. FIG. 11 is a graph schematically plotting a pixel brightness mean for each column in a previous frame image. As will be described below, in the case of the digital photographing apparatus according to the present embodiment, it is presumed that smear can be effectively corrected. Therefore, the graph of FIG. 11 does not include a relatively high pixel brightness mean or a relatively low pixel brightness mean as illustrated in FIG. 10. Since the second frame image and the previous frame image are consecutive to each other, they are greatly similar to each other except that only positions thereof are slightly different. Thus, the shapes of the graphs of FIGS. 10 and 11 are similar to each other.

Since locations of the subjects in the second frame image and the previous frame image become different due to movement of the digital photographing apparatus during photographing, the graphs of FIGS. 11 and 10 may not be matched with each other at portions other than the smear-uncorrected portion UCA and the smear-overcorrected portion OCA of FIG. 10. In other words, in contrast to the graph of FIG. 11, a true plot on the actual graph is moved horizontally. However, for convenience and clarity, the graph of FIG. 11 is illustrated so that portions other than the smear-uncorrected portion UCA and the smear-overcorrected portion OCA are matched with the graph of FIG. 10 by horizontally moving the graph of FIG. 11 in consideration of the location relationship between the subject in the second frame image and the subject in the previous frame image of the second frame image, which is acquired by the motion vector acquiring unit 52.

The miscorrected column identifying unit 54 identifies columns smear-miscorrected by the first smear correction unit 51 from among columns of the second frame image, which is from second image data. In other words, the miscorrected column identifying unit 54 identifies the positions of the smear-uncorrected portion UCA and the smear-overcorrected portion OCA from FIG. 10. To achieve this, the miscorrected column identifying unit 54 compares the pixel brightness mean for each column in the second frame image and that of the previous frame image acquired by the vertical mean acquiring unit 53 in consideration of a location relationship obtained by the motion vector acquiring unit 52. In other words, the locations of the smear-uncorrected portion UCA and the smear-overcorrected portion OCA may be identified by comparing data expressed in the graphs of FIGS. 10 and 11. More specifically, the miscorrected column identifying unit 54 identifies columns smear-miscorrected by the first smear correction unit 51 from among columns of the second frame image, based on a difference between the pixel brightness mean for each column in the second frame image and that in the previous frame image acquired by the vertical mean acquiring unit 53, the difference being obtained in consideration of the location relationship acquired by the motion vector acquiring unit 52.

Figure 12:
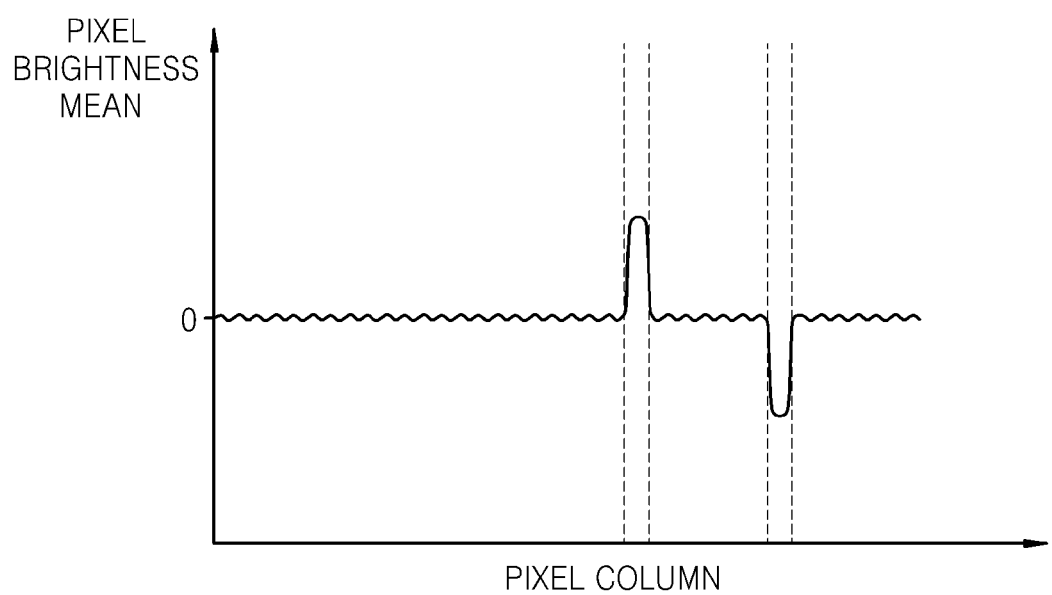
FIG. 12 is a graph schematically plotting smear-miscorrected columns from among columns of a current frame image in an intermediate stage of smear correction as illustrated in FIG. 7 as a result of comparison between the graphs of FIGS. 10 and 11.

As described above, since the graph of FIG. 11 is illustrated so that portions other than the smear-uncorrected portion UCA and the smear-overcorrected portion OCA are matched with the graph of FIG. 10 when the graph of FIG. 11 is horizontally moved in consideration of the location relationship between the subject in the second frame image and the subject in the previous frame image, which is the frame image prior to the second frame image, which is acquired by the motion vector acquiring unit 52, a difference between the graphs of FIGS. 10 and 11 may be represented as a graph illustrated in FIG. 12. In FIG. 12, small pixel brightness mean oscillation around 0 denotes small differences that can appear. Even though the second frame image and the previous frame image are adjacent to each other and thus similar to each other, there still may be a slight difference. Two large differences are shown in FIG. 12. The two big differences denote the smear-uncorrected portion UCA and the smear-overcorrected portion OCA of the second frame image.

The second smear correction unit 51' corrects the second image data by using data corresponding to columns of the previous frame image corresponding to smear-miscorrected columns identified by the miscorrected column identifying unit 54, thereby obtaining third image data. In other words, the second smear correction unit 51' corrects the second image data by replacing data corresponding to the smear-miscorrected columns identified by the miscorrected column identifying unit 54 with the data corresponding to the corresponding columns of the previous frame image, thereby obtaining the third image data. In brief, since the current frame image and the previous frame image are similar to each other, the second smear correction unit 51' replaces only smear-miscorrected columns with columns of the previous frame image that have no smear or have effectively-reduced smear, thereby obtaining third image data corresponding to a third frame image having effectively-reduced smear. Consequently, the third frame image becomes a final current frame image, and is used when smear-miscorrected columns are identified from the next frame image and corrected.

In the digital photographing apparatus according to the present embodiment, overcorrection of smear or correction of portions that should not be smear-corrected is effectively prevented, in contrast with a conventional digital photographing apparatus, leading to capturing of high-quality moving pictures or display of the same on a display unit.

Although not shown in FIG. 6, the digital signal processing unit 50 may further include a matching unit that matches the subject in the second frame image with the subject in the previous frame image in a horizontal direction by correcting at least one data from among data about the second image data and data about the previous frame image by using the location relationship acquired by the motion vector acquiring unit 52. In this case, the graph of FIG. 11 may be considered as representing the pixel brightness mean for each column that the vertical mean acquiring unit 53 obtained from data about the previous frame image corrected by the matching unit.

Figure 13:
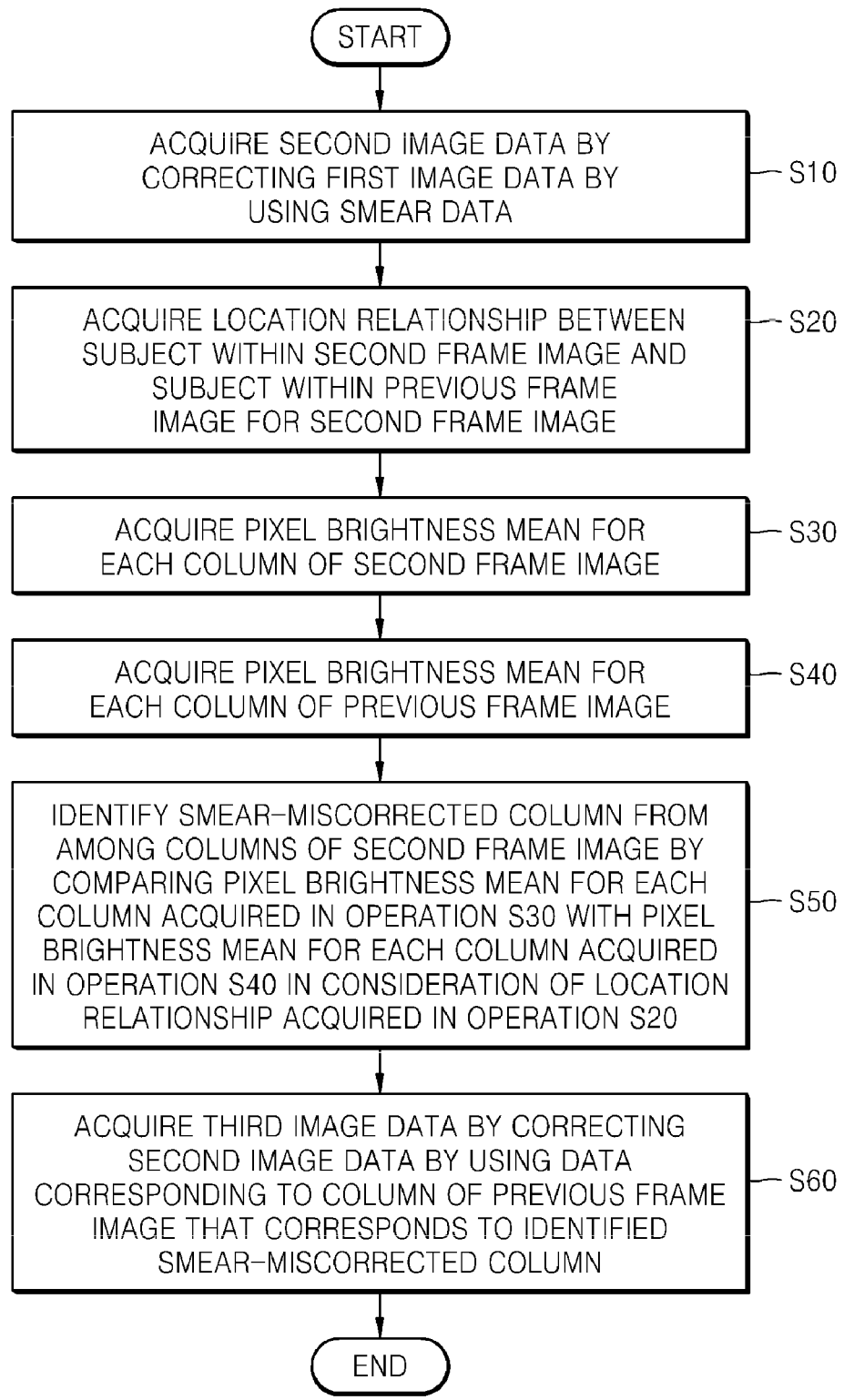
FIG. 13 is a flowchart schematically illustrating a method of controlling a digital photographing apparatus, according to another embodiment of the present invention.

FIG. 13 is a flowchart schematically illustrating a method of controlling a digital photographing apparatus, according to another embodiment of the present invention. Referring to FIG. 13, in operation S10, first image data generated from light incident upon an effective area of an imaging device is corrected using smear data generated by an optical black area that is disposed outside the effective area of the imaging device and extends horizontally, thereby obtaining second image data corresponding to a second frame image having reduced smear compared with a first frame image obtained from the first image data. The second frame image is the same as that described above with reference to FIG. 7.

Thereafter, in operation S20, a location relationship between a subject within the second frame image and that within a previous frame image for the second frame image is acquired. Acquiring the location relationship is the same as that described above with reference to FIGS. 8 and 9.

Then, in operation S30, a pixel brightness mean for each column of the second frame image is acquired. Then, in operation S40, a pixel brightness mean for each column of the previous frame image is acquired. The order in which operations S30 and S40 are performed may be switched, or operations S30 and S40 may be performed simultaneously. In this way, various changes may be made. The pixel brightness mean for each column of the second frame image may be represented in such a graph as shown in FIG. 10. The pixel brightness mean for each column of the previous frame image may be represented in such a graph as shown in FIG. 11. As described above, the graph of FIG. 11 is a graph obtained by horizontally moving an actual graph.

Next, in operation S50, the pixel brightness mean acquired in operation S30 is compared with the pixel brightness mean acquired in operation S40 in consideration of the location relationship acquired in operation S20, thereby identifying smear-miscorrected columns from among the columns of the second frame image. In other words, the smear-miscorrected columns may be identified from among the columns of the second frame image, according to a difference between the pixel brightness means acquired in operations S30 and S40, which can be represented as in FIG. 12.

Then, in operation S60, the second image data is corrected using data corresponding to columns of the previous frame image corresponding to smear-miscorrected columns identified in operation S50, thereby obtaining third image data. For example, operation S60 may be performed by replacing data corresponding to the smear-miscorrected columns identified in operation S50 with the data corresponding to the corresponding columns of the previous frame image.

In the method of controlling the digital photographing apparatus according to the present embodiment, overcorrection of smear or correction of portions that should not be smear-corrected is effectively prevented, in contrast with a conventional digital photographing apparatus controlling method, leading to capturing of high-quality moving pictures or display of the same on a display unit.

A start and a conclusion in FIG. 12 denote a start and a conclusion of smear correction in a current frame image, not a start and a conclusion of an operation of the digital photographing apparatus.

Although not shown in FIG. 13, the method may further include, before operations S30 and S40, an operation of matching the subject within the second frame image with the subject within the previous frame image in a horizontal direction by correcting at least one data from among data about the second image data and data about the previous frame image. For example, the graph of FIG. 11 may be considered as representing a case where operation S40 is performed after correcting the data about the previous frame image so as to match the subject within the second frame image with the subject within the previous frame image in a horizontal direction.

Figure 14:
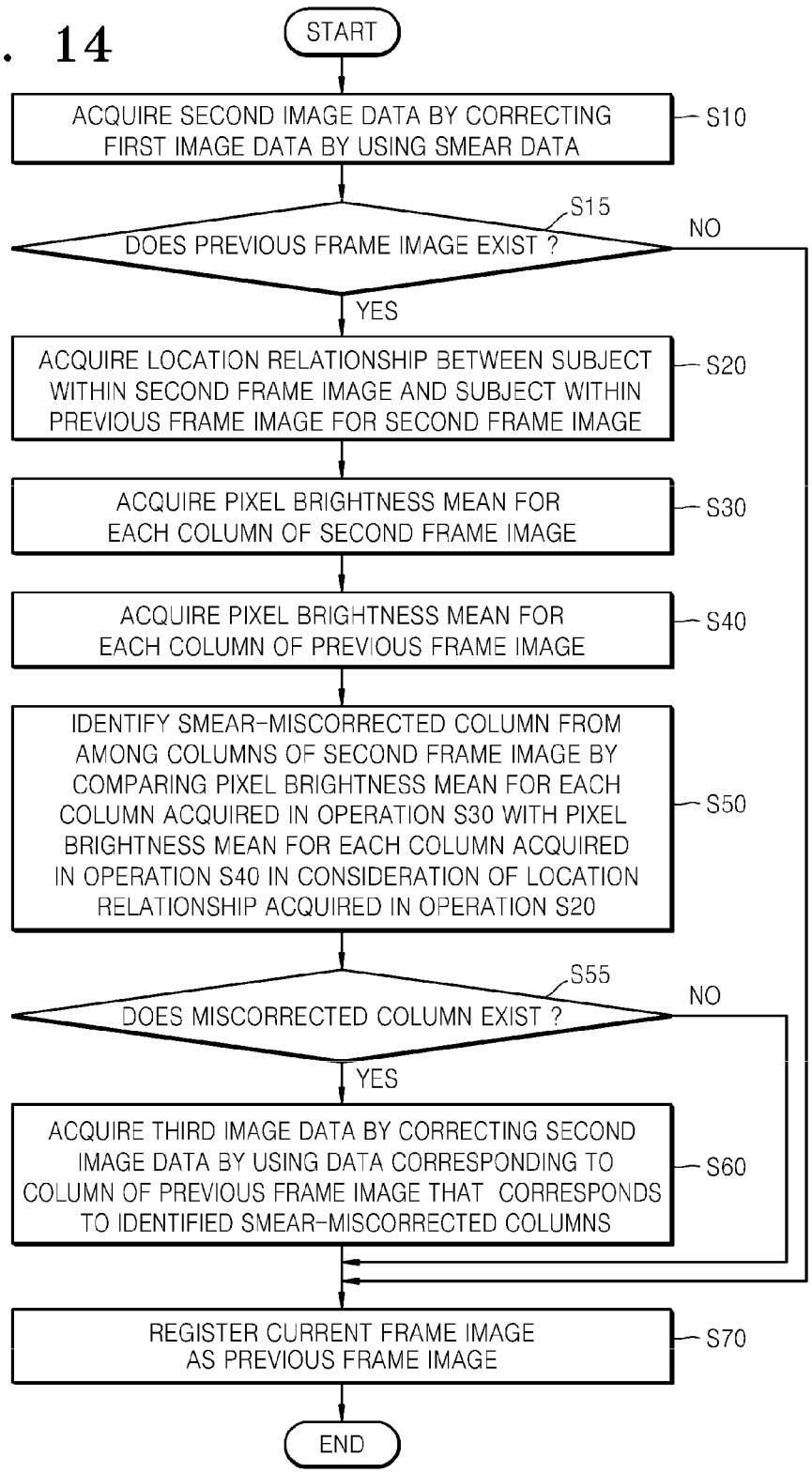
FIG. 14 is a flowchart schematically illustrating a method of controlling a digital photographing apparatus, according to another embodiment of the present invention.

FIG. 14 is a flowchart schematically illustrating a method of controlling a digital photographing apparatus, according to another embodiment of the present invention. The digital photographing apparatus controlling method according to the present embodiment is different from the digital photographing apparatus controlling method of FIG. 13 in that operation S15 of determining whether the previous frame image exists is further performed. In other words, if the previous frame image does not exist, after operation S10 of correcting first image data by using smear data in order to correct second image data is performed, operation S70 of registering a second frame image corresponding to the second image data, which can be considered as a current frame image, as a previous frame image is performed. Thus, the second frame image is used as the previous frame image when smear correction is performed on the next frame image. On the other hand, if it is determined in operation S15 that the previous frame image exists, the method proceeds similarly to the flow described above with reference to FIG. 13. However, in this case, operation S55 of determining whether miscorrected-columns exist is further performed after operation S50. Only if such miscorrected columns as illustrated in FIG. 12 exist, the method proceeds to operation S60 of acquiring third image data. On the other hand, if such miscorrected columns as illustrated in FIG. 12 do not exist, operation S70 of registering the second frame image, which can be considered as a current frame image, as a previous frame image is performed. Since operation S60 of acquiring the third image data is performed if miscorrected columns exist, if miscorrected columns exist, after operation S60, a third frame image that can be considered as a current frame image is registered as a previous frame image in operation S70.

Figure 15:
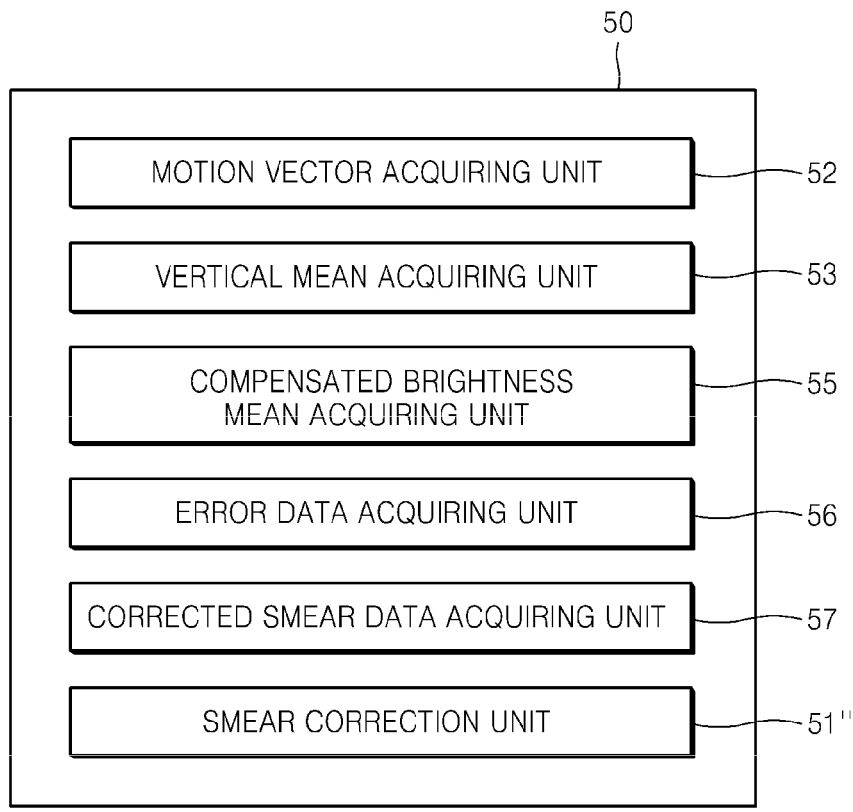
FIG. 15 is a conceptual diagram of a portion of the digital photographing apparatus of FIG. 5, according to another embodiment of the present invention.

FIG. 15 is a block diagram of a portion of a digital photographing apparatus according to another embodiment of the present invention.

The digital photographing apparatus according to the present embodiment includes a motion vector acquiring unit 52, a vertical mean acquiring unit 53, a compensated brightness mean acquiring unit 55, an error data acquiring unit 56, a corrected smear data acquiring unit 57, and a smear correction unit 51". Functions of the motion vector acquiring unit 52, the vertical mean acquiring unit 53, the compensated brightness mean acquiring unit 55, the error data acquiring unit 56, the corrected smear data acquiring unit 57, and the smear correction unit 51" will now be described with reference to FIGS. 10 through 12 and FIGS. 16 through 18.

As described above, the imaging device 30 has the effective area EA that generates image data from incident light, and the optical black area OBA that is disposed outside the effective area EA and extends horizontally. The motion vector acquiring unit 52, in contrast with the embodiment illustrated in FIG. 6, acquires a location relationship between a subject within a first frame image corresponding to first image data generated by the effective area EA and the subject within a previous frame image for the first frame image. Acquisition of only a horizontal location relationship is enough when considering the fact that smear is generated only vertically.

Figure 16:
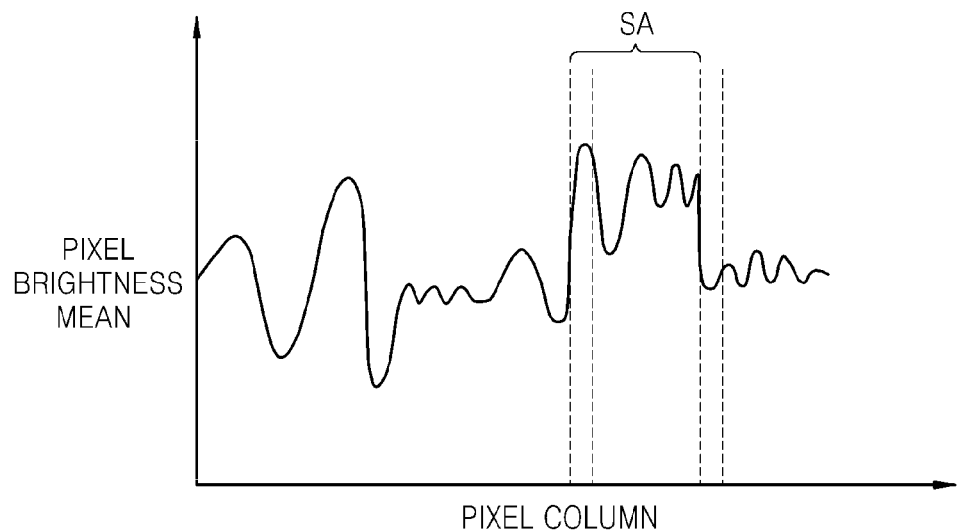
FIG. 16 is a graph schematically plotting a pixel brightness mean for each column in a current frame image that has not yet undergone smear correction.

The vertical mean acquiring unit 53 acquires a pixel brightness mean for each column of the first frame image. FIG. 16 is a graph schematically plotting such pixel brightness means. Referring to FIG. 16, the pixel brightness means are high in a smear-generated portion SA. The vertical mean acquiring unit 53 also acquires a pixel brightness mean for each column of the previous frame image. The acquired pixel brightness means may be represented as in the graph of FIG. 11. The graph of FIG. 11 has already been described above.

Figure 3:
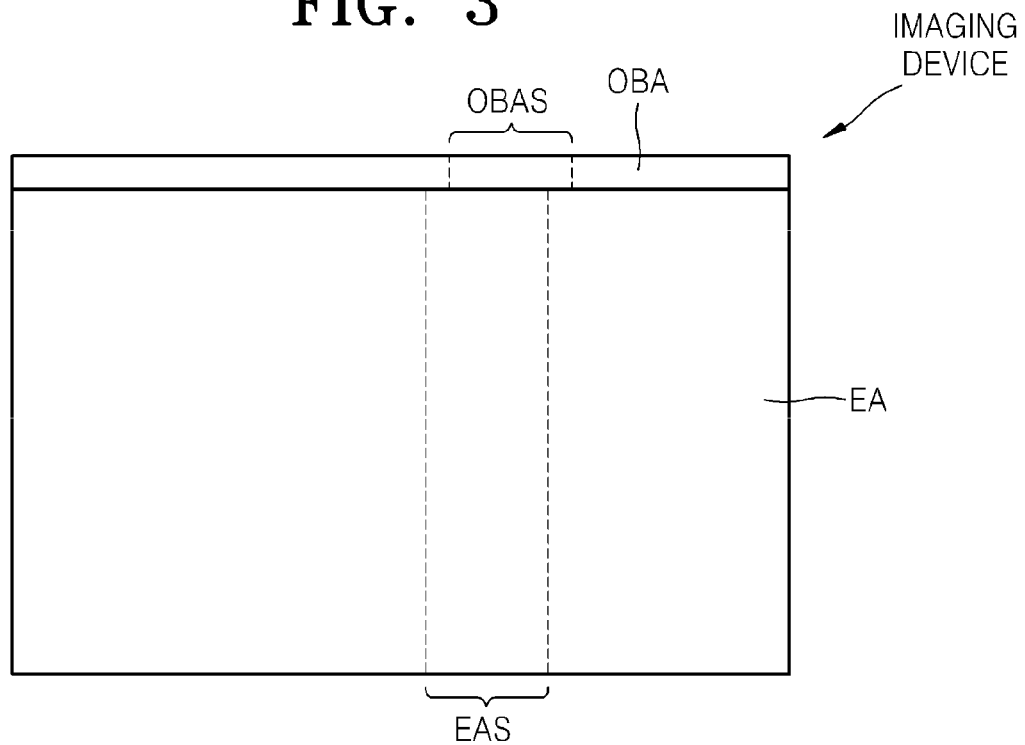
Figure 4:
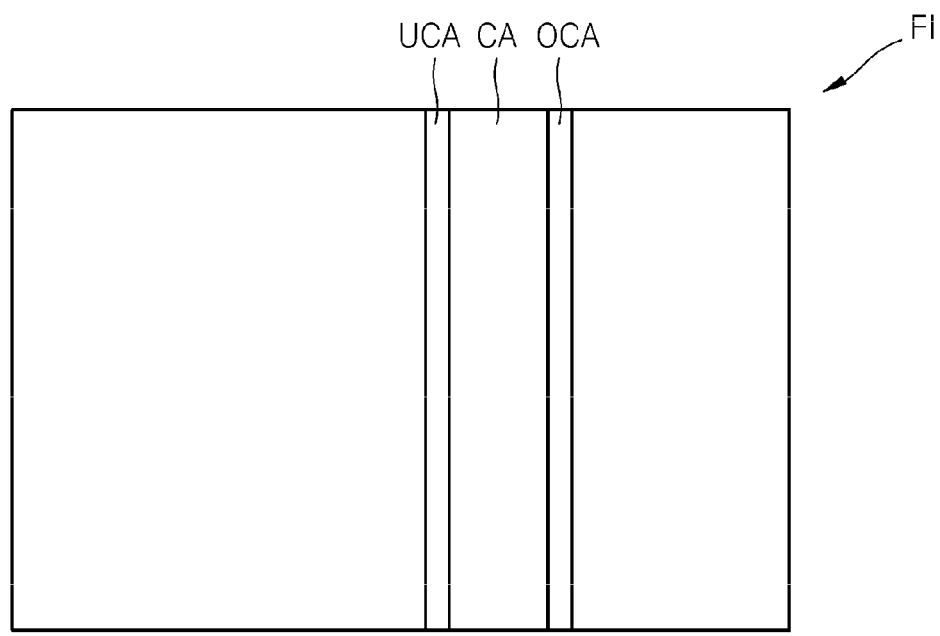
FIG. 4 is a pictorial diagram of a frame image having smears on a display unit of a conventional digital photographing apparatus.

The compensated brightness mean acquiring unit 55 acquires a compensated brightness mean by subtracting smear data generated by the optical black area OBA from the pixel brightness mean for each column in the first frame image acquired by the vertical mean acquiring unit 53. The compensated brightness mean denotes a result of compensation of such a pixel brightness mean as illustrated in FIG. 16. Since the smear data generated by the optical black area OBA may be represented as in FIG. 17, the smear-generated portion SA of the first frame image is not matched with a high brightness portion of the smear data for the same reason as the reason described above with reference to FIG. 3. Thus, the compensated brightness mean, which is a result of the subtraction of the smear data generated by the optical black area OBA from the pixel brightness mean for each column of the first frame image acquired by the vertical mean acquiring unit 53, may be represented in a graph as illustrated in FIG. 10.

The error data acquiring unit 56 acquires error data by comparing the compensated brightness mean (as shown in FIG. 10) acquired by the compensated brightness mean acquiring unit 55 with the pixel brightness mean (as shown in FIG. 11) for each column of the previous frame image acquired by the vertical mean acquiring unit 53 in consideration of the location relationship acquired by the motion vector acquiring unit 52. More specifically, the error data acquiring unit 56 acquires error data as illustrated in FIG. 12 by using a difference between the compensated brightness mean (as shown in FIG. 10) acquired by the compensated brightness mean acquiring unit 55 and the pixel brightness mean (as shown in FIG. 11) for each column of the previous frame image acquired by the vertical mean acquiring unit 53 in consideration of the location relationship acquired by the motion vector acquiring unit 52.

Figure 17:
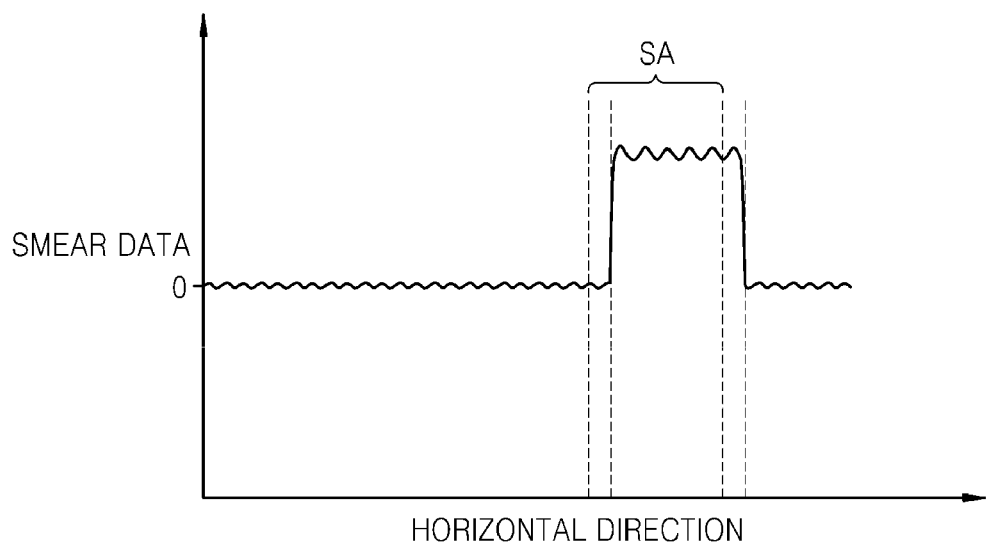
FIG. 17 is a graph schematically plotting uncorrected smear data.
Figure 18:
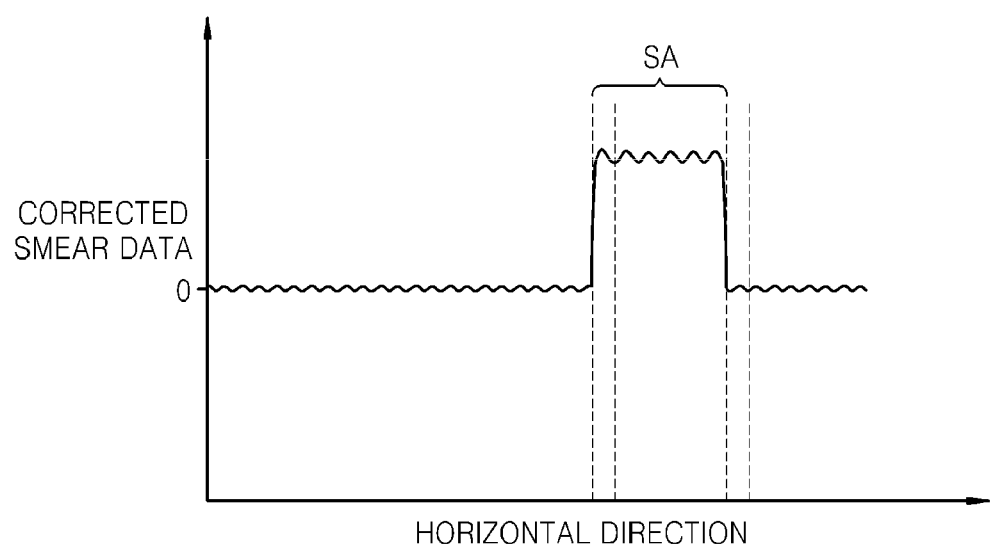
FIG. 18 is a graph schematically plotting corrected smear data.

The corrected smear data acquiring unit 57 acquires corrected smear data as illustrated in FIG. 18 by correcting the smear data as illustrated in FIG. 17 by using the error data as illustrated in FIG. 12 acquired by the error data acquiring unit 56. For example, the corrected smear data acquiring unit 57 may acquire the corrected smear data as illustrated in FIG. 18 by summing the error data as illustrated in FIG. 12 and the smear data as illustrated in FIG. 17. Referring to FIG. 18, the smear-generated portion SA of the first frame image coincides with the high brightness portion of the smear data.

The smear correction unit 51" corrects the first image data by using the corrected smear data acquired by the corrected smear data acquiring unit 57, thereby acquiring second image data. Since the smear-generated portion SA of the first frame image coincides with the high brightness portion of the smear data as illustrated in FIG. 18, a second frame image corresponding to the second image data obtained by correcting the first image data by using the corrected smear data corresponds to an image whose smear has been effectively corrected.

Although not shown in FIG. 15, the digital signal processing unit 50 may further include a matching unit that matches the subject within the first frame image with the subject within the previous frame image in a horizontal direction by correcting at least one from among data about the first image data and data about the previous frame image by using the location relationship acquired by the motion vector acquiring unit 52. In this case, the graph of FIG. 11 may be considered as representing pixel brightness means obtained by the vertical mean acquiring unit 53 from data about the previous frame image corrected by the matching unit.

Figure 19:
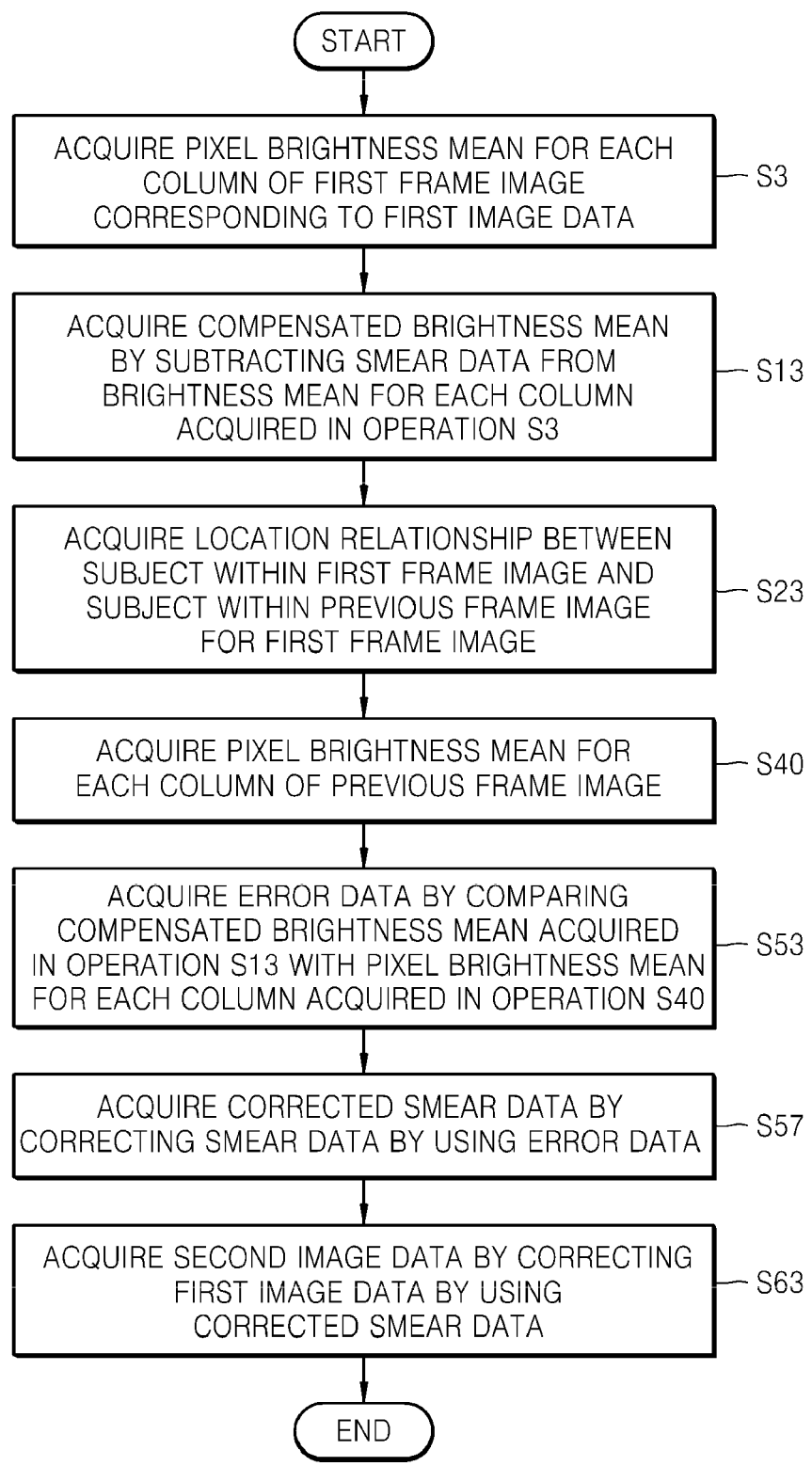
FIG. 19 is a flowchart schematically illustrating a method of controlling a digital photographing apparatus, according to another embodiment of the present invention.

FIG. 19 is a flowchart schematically illustrating a method of controlling a digital photographing apparatus, according to another embodiment of the present invention.

First, in operation S3, a pixel brightness mean for each column of a first frame image corresponding to first image data generated from light incident upon an effective area of an imaging device is acquired. The pixel brightness mean may be represented in a graph as illustrated in FIG. 16. Thereafter, in operation S13, a compensated brightness mean is acquired by subtracting smear data as illustrated in FIG. 17, which is generated by an optical black area of the imaging device that is disposed outside the effective area and extends horizontally, from the pixel brightness mean for each column acquired in operation S3. The compensated brightness mean may be represented in a graph as illustrated in FIG. 10.

Next, in operation S23, a location relationship between a subject within the first frame image and a subject within a previous frame image for the first frame image is acquired. In operation S40, a pixel brightness mean for each column of the previous frame image is acquired. The pixel brightness mean may be represented in a graph as illustrated in FIG. 11. The order in which operations S40 and S23 are performed may be switched, or operations S40 and S23 may be performed simultaneously. In this way, various changes may be made.

Thereafter, in operation S53, error data is acquired by comparing the compensated brightness mean acquired in operation S13 with the pixel brightness mean acquired in operation S40. The error data may be represented in a graph as illustrated in FIG. 12. For example, the error data may be acquired using a difference between the compensated brightness mean (as illustrated in FIG. 10) acquired in operation S13 and the pixel brightness mean (as illustrated in FIG. 11).

Then, in operation S57, corrected smear data as illustrated in FIG. 18 is acquired by correcting the smear data as illustrated in FIG. 17 by using the error data. The corrected smear data may be a result of summing of the smear data as illustrated in FIG. 17 and the error data as illustrated in FIG. 12.

Referring to FIG. 18, the smear-generated portion SA of the first frame image coincides with the high brightness portion of the smear data. Thus, second image data is acquired by correcting the first image data by using the corrected smear data, in operation S63, thereby acquiring a second image corresponding to the second image data, which can be considered as a final current frame image having effectively corrected smear.

Although not shown in FIG. 19, the method may further include, before operation S3, an operation of matching the subject within the first frame image with the subject within the previous frame image in a horizontal direction by correcting at least one data from among data about the first image data and data about the previous frame image. The method may also further include, before operation S40, an operation of matching the subject within the first frame image with the subject within the previous frame image in a horizontal direction by correcting the data about the previous frame image. For example, the graph of FIG. 11 may be considered as representing a case where operation S40 is performed after correcting the data corresponding to the previous frame image so as to match the subject within the first frame image with the subject within the previous frame image in a horizontal direction.

Figure 20:
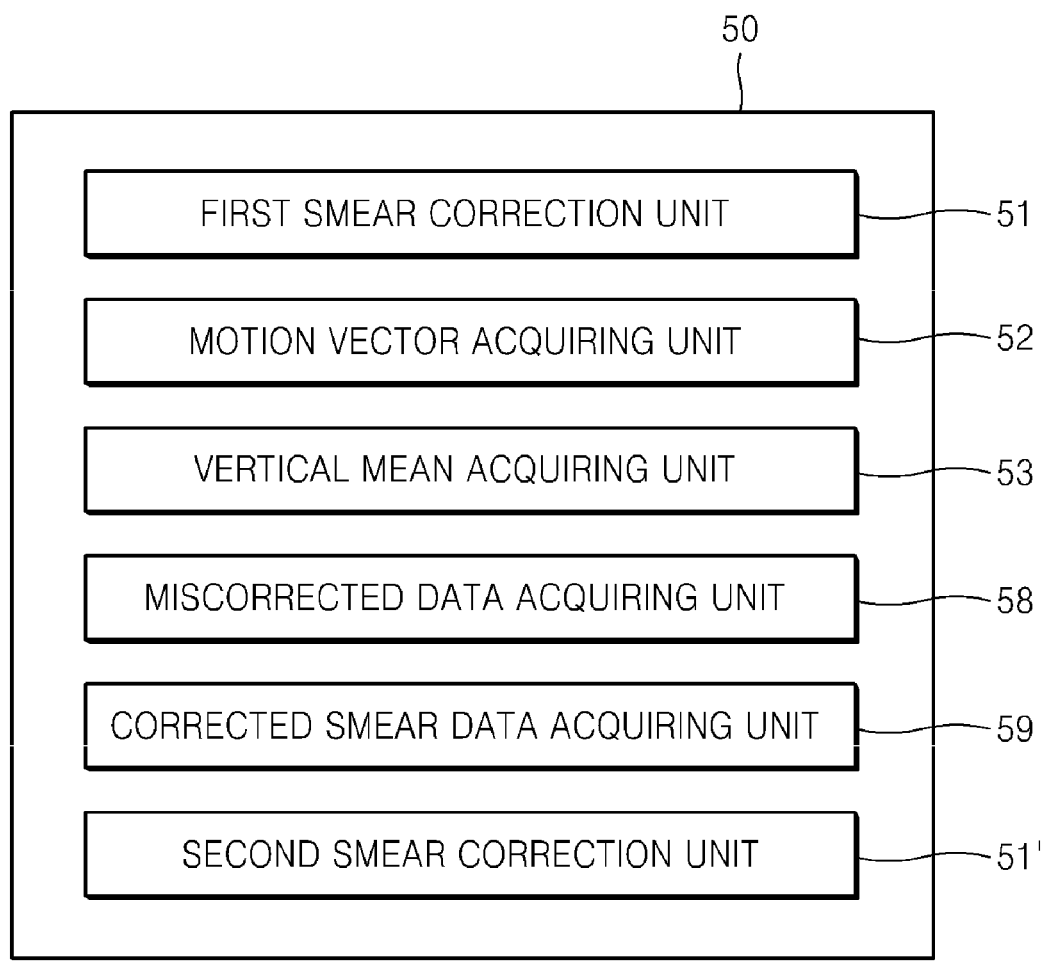
FIG. 20 is a conceptual diagram of a portion of the digital photographing apparatus of FIG. 5, according to another embodiment of the present invention.

FIG. 20 is a block diagram schematically illustrating a portion of a digital photographing apparatus according to another embodiment of the present invention.

The digital photographing apparatus according to the present embodiment includes a first smear correction unit 51, a motion vector acquiring unit 52, a vertical mean acquiring unit 53, a miscorrected data acquiring unit 58, a corrected smear data acquiring unit 59, and a second smear correction unit 51'. Functions of the first smear correction unit 51, the motion vector acquiring unit 52, the vertical mean acquiring unit 53, the miscorrected data acquiring unit 58, the corrected smear data acquiring unit 59, and the second smear correction unit 51' will now be described with reference to FIGS. 10 through 12 and FIGS. 17 and 18.

An imaging device has, as described above, an effective area EA which generates image data from incident light, and an optical black area OBA which is disposed outside the effective area EA and extends horizontally.

Figure 1:
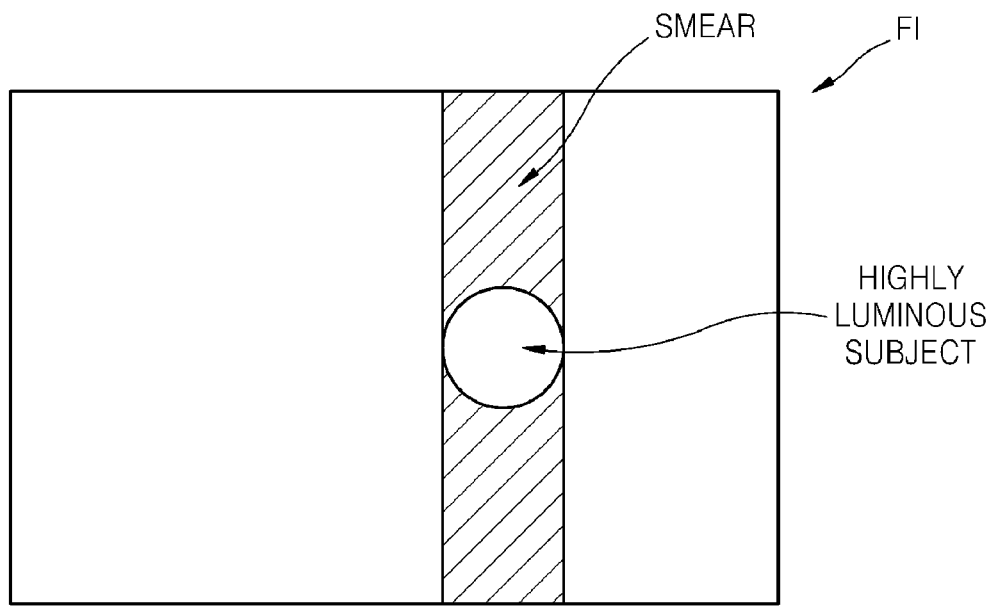
FIG. 1 is a pictorial diagram of a display unit of a conventional digital photographing apparatus, wherein smear is generated during display of a moving image on the display unit.
Figure 2:
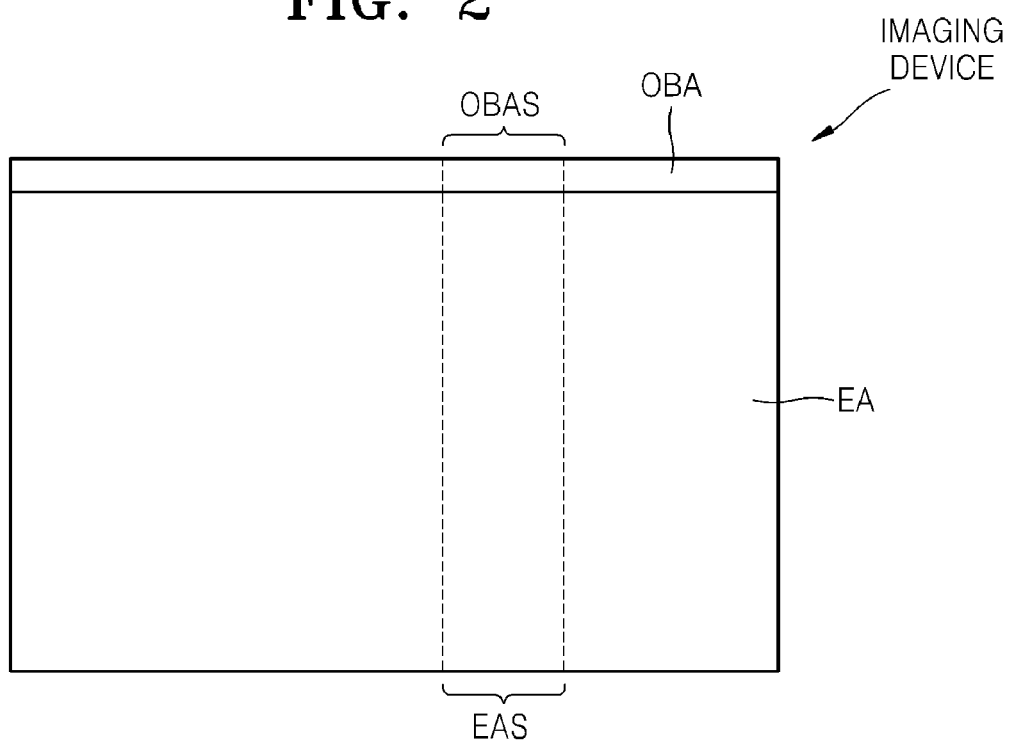
FIGS. 2 and 3 are pictorial diagrams schematically illustrating an image device.

The first smear correction unit 51 corrects first image data generated by the effective area EA by using smear data, as illustrated in FIG. 17, generated by the optical black area OBA, thereby acquiring second image data corresponding to a second frame image, as illustrated in FIG. 7, having less smear than the first frame image corresponding to the first image data as illustrated in FIG. 2.

The motion vector acquiring unit 52 acquires a location relationship between a subject within the first frame image and the subject within a previous frame image for the second frame image. Acquisition of only a horizontal location relationship is enough when considering the fact that smear is generated only vertically.

The vertical mean acquiring unit 53 acquires a pixel brightness mean for each column of the second frame image. The pixel brightness mean may be represented in a graph as illustrated in FIG. 10. The vertical mean acquiring unit 53 also acquires a pixel brightness mean for each column of the previous frame image. The acquired pixel brightness mean may be represented as in the graph of FIG. 11. A horizontal location change of the graph of FIG. 11 has already been described above.

The miscorrected data acquiring unit 58 acquires miscorrected data about smear-miscorrected columns from among the columns of the second frame image as illustrated in FIG. 10 and the amounts of the miscorrection by comparing the pixel brightness mean for each column of the second frame image acquired by the vertical mean acquiring unit 53 with the pixel brightness mean for each column of the previous frame image as illustrated in FIG. 11 in consideration of the location relationship acquired by the motion vector acquiring unit 52. For example, the miscorrected data acquiring unit 58 may acquire the miscorrected data about the smear-miscorrected columns from among the columns of the second frame image as illustrated in FIG. 10 and the amounts of the miscorrection according to a difference between the pixel brightness mean for each column of the second frame image acquired by the vertical mean acquiring unit 53 and the pixel brightness mean for each column of the previous frame image in consideration of the location relationship acquired by the motion vector acquiring unit 52. The miscorrected data may be represented in a graph as illustrated in FIG. 12.

The corrected smear data acquiring unit 59 acquires corrected smear data as illustrated in FIG. 18 by correcting the smear data as illustrated in FIG. 17 by using the miscorrected data (as illustrated in FIG. 12) acquired by the miscorrected data acquiring unit 58. For example, the corrected smear data acquiring unit 57 may acquire the corrected smear data as illustrated in FIG. 18 by summing the error data as illustrated in FIG. 12 and the smear data as illustrated in FIG. 17. Referring to FIG. 18, the smear-generated portion SA of the first frame image coincides with the high brightness portion of the smear data.

The second smear correction unit 51' corrects the first image data by using the corrected smear data (as illustrated in FIG. 12) acquired by the corrected smear data acquiring unit 59, thereby acquiring third image data. Since the smear-generated portion SA of the first frame image coincides with the high brightness portion of the smear data as illustrated in FIG. 18, a third frame image, corresponding to the third image data obtained by correcting the first image data by using the corrected smear data, corresponds to an image whose smear has been effectively corrected.

Although not shown in FIG. 20, the digital signal processing unit 50 may further include a matching unit that matches the subject within the second frame image with the subject within the previous frame image in a horizontal direction by correcting at least one from among data about the second image data and data about the previous frame image by using the location relationship acquired by the motion vector acquiring unit 52. In this case, the graph of FIG. 11 may be considered as representing pixel brightness means of columns, which the vertical mean acquiring unit 53 obtain from data about the previous frame image corrected by the matching unit.

Figure 21:
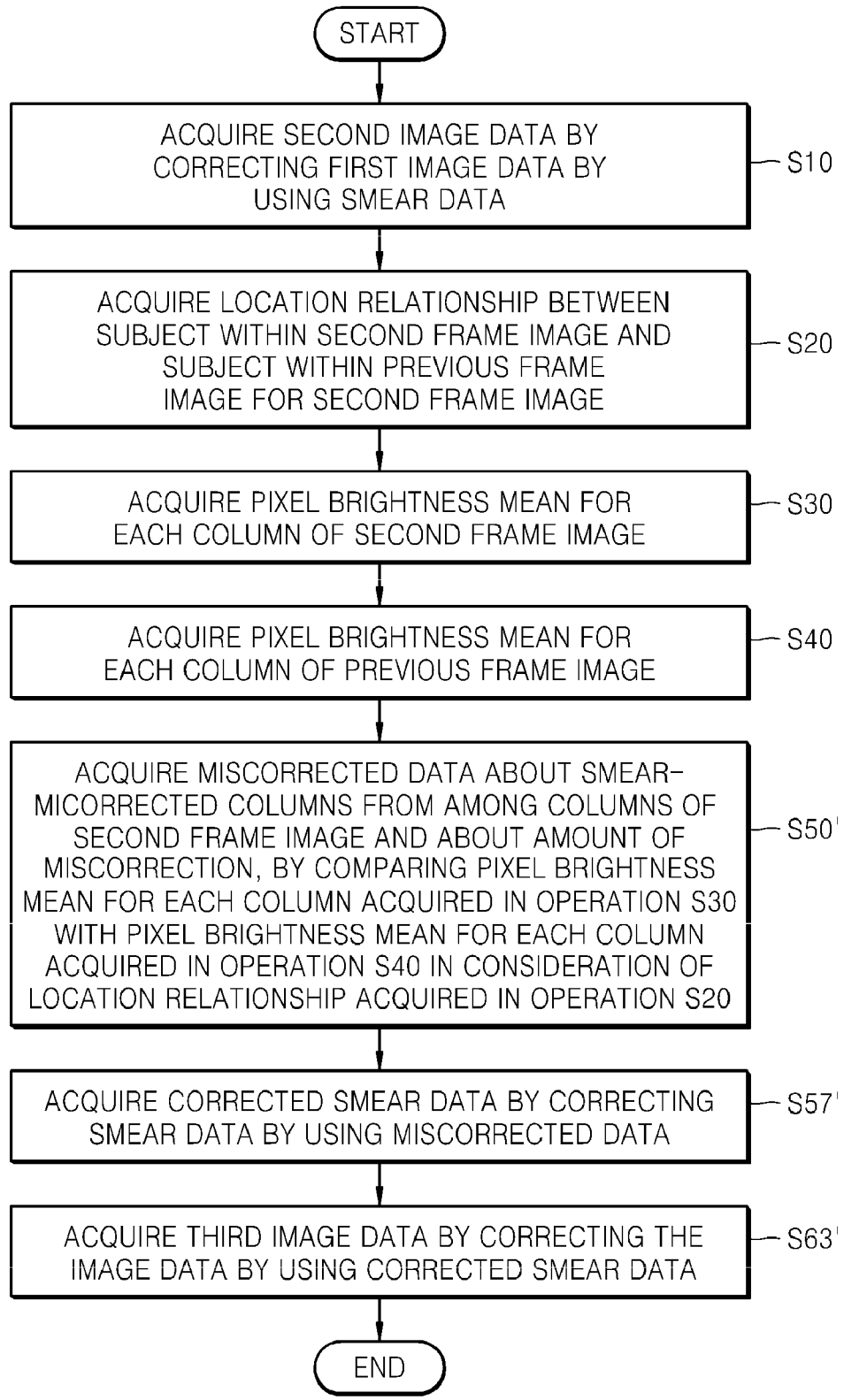
FIG. 21 is a flowchart schematically illustrating a method of controlling a digital photographing apparatus, according to another embodiment of the present invention.

FIG. 21 is a flowchart schematically illustrating a method of controlling a digital photographing apparatus, according to another embodiment of the present invention.

First, in operation S10, first image data generated from light incident upon an effective area of an imaging device is corrected using smear data (as illustrated in FIG. 17) generated by an optical black area that is disposed outside the effective area of the imaging device and extends horizontally, thereby obtaining second image data corresponding to a second frame image having reduced smear compared with a first frame image obtained from the first image data. Thereafter, in operation S20, a location relationship between a subject within the second frame image and that within a previous frame image for the second frame image is acquired.

Then, in operation S30, a pixel brightness mean for each column of the second frame image is acquired. Then, in operation S40, a pixel brightness mean for each column of the previous frame image is acquired. The order in which operations S30 and S40 are performed may be switched, or operations S30 and S40 may be performed simultaneously. The pixel brightness mean for each column of the second frame image may be represented in such a graph as shown in FIG. 10. The pixel brightness mean for each column of the previous frame image may be represented in such a graph as shown in FIG. 11. Of course, the horizontal location of the graph of FIG. 11 may have been corrected as illustrated above in the previous embodiments.

Next, in operation S50', the pixel brightness mean acquired in operation S30 is compared with the pixel brightness mean acquired in operation S40 in consideration of the location relationship acquired in operation S20, thereby acquiring miscorrected data about smear-miscorrected columns from among the columns of the second frame image and the amounts of the miscorrection. For example, the miscorrected data that can be represented as illustrated in FIG. 12 may be acquired using a difference between the graphs of FIGS. 10 and 11.

Then, in operation S57', corrected smear data is acquired by correcting the smear data by using the miscorrected data acquired in operation S50'. The corrected smear data may be represented in a graph illustrated in FIG. 18, which is a sum of the graphs of FIGS. 12 and 17. Referring to FIG. 18, the smear-generated portion SA of the first frame image coincides with the high brightness portion of the smear data.

Thereafter, in operation S63', the first image data is corrected using the corrected smear data so as to acquire third image data that can be considered as data about a final current frame image having reduced smear. Referring to FIG. 18, the smear-generated portion SA of the first frame image coincides with the high brightness portion of the smear data. Thus, a third frame image corresponding to the third image data, which can be considered as a final current frame image having effectively corrected smear, can be acquired by performing operation S63' of acquiring the third image data by correcting the first image data by using the corrected smear data.

Although not shown in FIG. 21, the method may further include, before operations S30 and S40, an operation of matching the subject within the second frame image with the subject within the previous frame image in a horizontal direction by correcting at least one from among data about the second image data and data about the previous frame image. The method may also further include, before operation S40, an operation of matching the subject within the second frame image with the subject within the previous frame image in a horizontal direction by correcting the data about the previous frame image. For example, the graph of FIG. 11 may be considered as representing a case where operation S40 is performed after correcting the data about the previous frame image so as to match the subject within the first frame image with the subject within the previous frame image in a horizontal direction.

According to a digital photographing apparatus according to the present invention, a method of controlling the same according to the present invention, and a recording medium having recorded thereon a program for executing the method, smear generation can be effectively reduced during capturing of moving pictures or display of moving pictures.

Programs for executing the digital photographing apparatus controlling methods according to the above-described embodiments and their modified embodiments in a digital photographing apparatus can be stored in recording media. The recording media may be the storage medium 70 of FIG. 5, or the memory 60 of FIG. 5, or the other types of recording media. The recording media include for example and not limited to storing media, such as magnetic storing media (e.g., read-only memories (ROMs), floppy disks, hard disk, and the like) and optical reading media (e.g., CD-ROMs (compact disc-ROMs), DVDs (digital versatile discs)). The instructions for executing on a processor may be organized into software modules or algorithms.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A digital photographing apparatus comprising:
    an imaging device comprising an effective area that generates first image data from incident light and an optical black area that is disposed outside the effective area and extends horizontally;
    a first smear correction unit that corrects the first image data generated by the effective area by using smear data generated by the optical black area, and thereby acquires second image data corresponding to a second frame image comprising less smear than a first frame image corresponding to the first image data;
    a motion vector acquiring unit that acquires a location relationship between a subject within the second frame image and a subject within a previous frame image for the second frame image;
    a vertical mean acquiring unit that acquires a pixel brightness mean for each column of the second frame image and a pixel brightness mean for each column of the previous frame image;
    a miscorrected column identifying unit that identifies columns smear-miscorrected by the first smear correction unit from among columns of the second frame image by comparing the pixel brightness mean for each column of the second frame image and the pixel brightness mean for each column of the previous frame image acquired by the vertical mean acquiring unit, taking into consideration the location relationship acquired by the motion vector acquiring unit; and
    a second smear correction unit that corrects the second image data by using data corresponding to columns of the previous frame image that correspond to the smear-miscorrected columns identified by the miscorrected column identifying unit, thereby acquiring third image data.

2. The digital photographing apparatus of claim 1, further comprising:
    a matching unit that matches the subject within the second frame image with the subject within the previous frame image in a horizontal direction by correcting at least one of data about the second image data and data about the previous frame image by using the location relationship acquired by the motion vector acquiring unit.

3. The digital photographing apparatus of claim 1, wherein the miscorrected column identifying unit identifies columns smear-miscorrected by the first smear correction unit from among the columns of the second frame image, based on a difference between the pixel brightness mean for each column of the second frame image and the pixel brightness mean for each column of the previous frame image acquired by the vertical mean acquiring unit, the difference being obtained that takes into consideration the location relationship acquired by the motion vector acquiring unit.

4. The digital photographing apparatus of claim 1, wherein the second smear correction unit corrects the second image data by replacing data corresponding to the smear-miscorrected columns identified by the miscorrected column identifying unit with the data corresponding to the corresponding column of the previous frame image, thereby obtaining the third image data.

5. A method of controlling a digital photographing apparatus, the method comprising:
    correcting first image data generated from light incident upon an effective area of an imaging device by using smear data generated by an optical black area that is disposed outside the effective area of the imaging device and extends horizontally, thereby obtaining second image data corresponding to a second frame image having reduced smear compared to a first frame image obtained from the first image data;
    acquiring a location relationship between a subject within the second frame image and a subject within a previous frame image for the second frame image;
    acquiring a pixel brightness mean for each column of the second frame image;
    acquiring a pixel brightness mean for each column of the previous frame image;
    comparing the acquired pixel brightness mean for each column of the second frame image to the acquired pixel brightness mean for each column of the previous frame image taking into consideration the acquired location relationship, thereby identifying smear-miscorrected columns from among the columns of the second frame image; and
    correcting the second image data by using data corresponding to columns of the previous frame image that corresponds to the identified smear-miscorrected columns, thereby obtaining third image data.

6. The method of claim 5, wherein the acquiring of the location relationship comprises:
    matching the subject within the second frame image with the subject within the previous frame image in a horizontal direction by correcting at least one from among data about the second image data and data about the previous frame image.

7. The method of claim 5, wherein the identifying of the smear-miscorrected columns comprises:
    identifying the smear-miscorrected columns from among the columns of the second frame image according to a difference between the pixel brightness mean for each column of the second frame image and the pixel brightness mean for each column of the previous frame image, the difference being obtained that takes into consideration the location relationship.

8. The method of claim 5, wherein the acquiring of the third image data comprises:
obtaining the third image data by correcting the second image data by replacing data corresponding to the identified smear-miscorrected columns with the data corresponding to the corresponding columns of the previous frame image.

9. A digital photographing apparatus comprising:
an imaging device comprising an effective area that generates first image data from incident light and an optical black area that is disposed outside the effective area and extends horizontally;
a motion vector acquiring unit that acquires a location relationship between a subject within a first frame image corresponding to first image data generated by the effective area and a subject within a previous frame image for the first frame image;
a vertical mean acquiring unit that acquires a pixel brightness mean for each column of the first frame image and a pixel brightness mean for each column of the previous frame image;
a compensated brightness mean acquiring unit that acquires a compensated brightness mean by subtracting smear data generated by the optical black area from the pixel brightness mean for each column of the first frame image acquired by the vertical mean acquiring unit;
an error data acquiring unit that acquires error data by comparing the compensated brightness mean acquired by the compensated brightness mean acquiring unit with the pixel brightness mean for each column of the previous frame image acquired by the vertical mean acquiring unit taking into consideration the location relationship acquired by the motion vector acquiring unit;
a corrected smear data unit that acquires corrected smear data by correcting the smear data by using the error data acquired by the error data acquiring unit; and
a smear correction unit that corrects the first image data by using the corrected smear data acquired by the corrected smear data acquiring unit, thereby acquiring second image data.

10. The digital photographing apparatus of claim 9, further comprising:
a matching unit that matches the subject within the first frame image with the subject within the previous frame image in a horizontal direction by correcting at least one from among data about the first image data and data about the previous frame image by using the location relationship acquired by the motion vector acquiring unit.

11. The digital photographing apparatus of claim 9, wherein the error data acquiring unit acquires the error data by using a difference between the compensated brightness mean acquired by the compensated brightness mean acquiring unit and the pixel brightness mean for each column of the previous frame image acquired by the vertical mean acquiring unit, the difference being obtained taking into consideration the location relationship acquired by the motion vector acquiring unit.

12. A method of controlling a digital photographing apparatus, the method comprising:
acquiring a pixel brightness mean for each column of a first frame image corresponding to first image data generated from light incident upon an effective area of an imaging device;
acquiring a compensated brightness mean by subtracting, from the acquired pixel brightness mean for each column of the first frame image, smear data generated by an optical black area of the imaging device that is disposed outside the effective area and extends horizontally;
acquiring a location relationship between a subject within the first frame image and the same subject within a previous frame image for the first frame image;
acquiring a pixel brightness mean for each column of the previous frame image;
acquiring error data by comparing the acquired compensated brightness mean with the pixel brightness mean for each column of the previous frame image taking into consideration the acquired location relationship;
acquiring corrected smear data by correcting the smear data by using the error data; and
acquiring second image data by correcting the first image data by using the corrected smear data.

13. The method of claim 12, wherein the acquiring of the location relationship comprises:
matching the subject within the first frame image with the subject within the previous frame image in a horizontal direction by correcting at least one from among data about the first image data and data about the previous frame image.

14. The method of claim 12, wherein the acquiring of the error data comprises:
acquiring the error data according to a difference between the acquired compensated brightness mean and the acquired pixel brightness mean for each column of the previous frame image, the difference being obtained taking into consideration the acquired location relationship.

15. A digital photographing apparatus comprising:
an imaging device having an effective area that generates image data from incident light and an optical black area that is disposed outside the effective area and extends horizontally;
a first smear correction unit that corrects first image data generated by the effective area by using smear data generated by the optical black area, thereby acquiring second image data corresponding to a second frame image having less smear than a first frame image corresponding to the first image data;
a motion vector acquiring unit that acquires a location relationship between a subject within the second frame image and a subject within a previous frame image for the second frame image;
a vertical mean acquiring unit that acquires a pixel brightness mean for each column of the second frame image and a pixel brightness mean for each column of the previous frame image;
a miscorrected data acquiring unit that acquires miscorrected data about smear-miscorrected columns from among columns of the second frame image and the amounts of the miscorrection, by comparing the pixel brightness mean for each column of the second frame image and the pixel brightness means for each column of the previous frame image acquired by the vertical mean acquiring unit, taking into consideration the location relationship acquired by the motion vector acquiring unit;
a corrected smear data acquiring unit that acquires corrected smear data by correcting the smear data by using the miscorrected data acquired by the miscorrected data acquiring unit; and a second smear correction unit that corrects the first image data by using the corrected smear data acquired by the corrected smear data acquiring unit, thereby acquiring third image data.

16. The digital photographing apparatus of claim 15, further comprising:
a matching unit that matches the subject within the second frame image with the subject within the previous frame image in a horizontal direction by correcting at least one from among data about the second image data and data about the previous frame image by using the location relationship acquired by the motion vector acquiring unit.

17. The digital photographing apparatus of claim 15, wherein the miscorrected data acquiring unit acquires miscorrected data about smear-miscorrected columns from among columns of the second frame image and the amounts of the miscorrection, based on a difference between the pixel brightness mean for each column of the second frame image and the pixel brightness mean for each column of the previous frame image acquired by the vertical mean acquiring unit, the difference being obtained taking into consideration the location relationship acquired by the motion vector acquiring unit.

18. A method of controlling a digital photographing apparatus, the method comprising:
correcting first image data generated from light incident upon an effective area of an imaging device by using smear data generated by an optical black area that is disposed outside the effective area of the imaging device and extends horizontally, thereby obtaining second image data corresponding to a second frame image having less smear than a first frame image obtained from the first image data;
acquiring a location relationship between a subject within the second frame image and a subject within a previous frame image for the second frame image;
acquiring a pixel brightness mean for each column of the second frame image;
acquiring a pixel brightness mean for each column of the previous frame image;
comparing the acquired pixel brightness mean for each column of the second frame image with the acquired pixel brightness mean for each column of the previous frame image, taking into consideration the acquired location relationship, thereby acquiring miscorrected data about smear-miscorrected columns from among the columns of the second frame image and about the amounts of miscorrection;
acquiring corrected smear data by correcting the smear data by using the miscorrected data; and
acquiring third image data by correcting the first image data by using the corrected smear data.

19. The method of claim 18, wherein the acquiring of the location relationship comprises:
matching the subject within the second frame image with the subject within the previous frame image in a horizontal direction by correcting at least one of data about the second image data and data about the previous frame image.

20. The method of claim 18, wherein the acquiring of the miscorrected data comprises:
acquiring the miscorrected data about the smear-miscorrected columns from among the columns of the second frame image and about the amounts of miscorrection according to a difference between the pixel brightness mean for each column of the second frame image and the pixel brightness mean for each column of the previous frame image, the difference being obtained taking into consideration the location relationship.

* * * * *